(12) United States Patent
Lee et al.

(10) Patent No.: US 8,045,112 B2
(45) Date of Patent: Oct. 25, 2011

(54) DISPLAY DEVICE AND METHOD OF MANUFACTURING THE SAME

(75) Inventors: Jun-woo Lee, Anyang-si (KR);
Hwa-sung Woo, Suwon-si (KR);
Baek-kyun Jeon, Yongin-si (KR);
Ji-won Sohn, Seoul (KR); In-suk Lee, Suwon-si (KR); Kyoung-tae Kim, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 775 days.

(21) Appl. No.: 12/147,720

(22) Filed: Jun. 27, 2008

(65) Prior Publication Data

US 2009/0002588 A1    Jan. 1, 2009

(30) Foreign Application Priority Data

Jun. 27, 2007    (KR) .................... 10-2007-0063821

(51) Int. Cl.
*G02F 1/1333* (2006.01)

(52) U.S. Cl. ....................................... 349/129
(58) Field of Classification Search .................. 349/129
See application file for complete search history.

*Primary Examiner* — Phu Vu
(74) *Attorney, Agent, or Firm* — Cantor Colburn LLP

(57) ABSTRACT

A display device includes: a first panel having a pixel region including a pixel electrode therein; a second panel having a common electrode facing the first panel; a liquid crystal layer having vertically aligned liquid crystal molecules interposed between the first and second panels; a first alignment layer disposed on the pixel electrode; and a second alignment layer disposed on the common electrode. At least one of the pixel electrode and the common electrode has a micro slit pattern. At least one of the first and second alignment layers divides the pixel region into domains, is formed to have pretilt directions corresponding to a given domain, and pretilts the vertically aligned liquid crystal molecules in the given domain. A direction of summed horizontal components of a fringe field at an edge of the pixel region is substantially equal to a direction of summed horizontal components of a pretilt direction of the at least one of the first and second alignment layer.

30 Claims, 12 Drawing Sheets

DISPLAY DEVICE AND METHOD OF MANUFACTURING THE SAME

This application claims priority to Korean Patent Application No. 10-2007-0063821, filed on Jun. 27, 2007, and all the benefits accruing therefrom under 35 U.S.C. §119, the contents of which in its entirety are incorporated herein by reference.

BACKGROUND OF INVENTION

1. Field of the Invention

The present invention relates to a display device and a method of manufacturing the same, and more particularly, to a display device having an improved viewing angle, an enhanced display characteristic and an enhanced manufacturing efficiency, and a method of manufacturing the same.

2. Description of the Related Art

Among a variety of types of display devices, a liquid crystal display ("LCD") device has improved characteristics over other display devices due to recently developed semiconductor technology.

For example, the LCD device has advantages of smaller size, lighter weight and lower power consumption. As a result, the LCD device is often used to replace a cathode ray tube ("CRT"). Further, the LCD device is frequently used in relatively small-sized products such as a mobile phone or a portable digital assistant ("PDA"), for example, as well as in mid- to large-sized products such as a monitor or a television, for example. In addition, the LCD device is used in a large number of information processing apparatuses which require a display means.

However, the LCD device has a disadvantage, in that a viewing angle is narrow with respect to other display devices. To overcome this disadvantage and to enhance a display characteristic having a wider viewing angle, a vertically aligned ("VA") mode LCD device has been developed. In the VA LCD device, a single pixel, a minimum unit for displaying an image in the LCD device, is divided into a plurality of domains, and a major axis of liquid crystal molecules is aligned in a substantially vertical direction with respect to two opposite facing substrates when no electric field exists between the two opposite facing pixels.

Further, the liquid crystal molecules of a respective domain in the VA mode LCD device are aligned to have pretilt directions different than pretilt directions of other domains. More specifically, in a patterned vertically aligned ("PVA") mode LCD device, pretilt directions of the liquid crystal molecules are induced by a fringe field produced by cut-off patterns formed on a common electrode and an opposite pixel electrode facing the pixel electrode.

However, in the PVA mode LCD device, an additional manufacturing process is required to form the cut-off pattern on the common electrode and the pixel electrode. Similarly, an additional process is also required in other modes LCD devices (e.g., other than the PVA mode LCD device) to align the liquid crystal molecules. As a result, LCD devices of the prior art have a disadvantage of decreased manufacturing efficiency, due to the additional manufacturing processes thereof.

Moreover, a VA mode LCD device of the prior art has a problem of a region of uncontrolled liquid crystal molecules due to interference or collisions between the liquid crystal molecules aligned in different respective pretilt directions, or due to an influence on the liquid crystal molecules by an unintentional force. The region of uncontrolled liquid crystal molecules deteriorates light transmittance and causes the LCD display device brightness to decrease.

BRIEF SUMMARY OF THE INVENTION

Exemplary embodiments of the present invention include a display device and a method of manufacturing the display device, wherein the display device has an improved viewing angle, enhanced display characteristic and increased manufacturing efficiency.

A display device according to an exemplary embodiment of the present invention includes: a first panel including a pixel electrode in the pixel region; a second panel facing to the first panel and having a common electrode; a liquid crystal layer interposed between the first panel and the second panel, the liquid crystal layer having vertically aligned liquid crystal molecules; a first alignment layer disposed on the pixel electrode; and a second alignment layer disposed on the common electrode.

At least one of the pixel electrode and the common electrode has a plurality of micro slits to form a plurality of domains.

The liquid crystal molecules are pretilted by an aligning force induced by the first alignment layer and the second alignment layer and an average direction of the liquid crystal molecules is substantially parallel to an extending direction of the micro slits within each of the domains when the pretilted liquid crystal molecules are projected on the first panel.

In an exemplary embodiment of the present invention, the common electrode may be slitless.

In an exemplary embodiment of the present invention, the first alignment layer and the second alignment layer may include a photo sensitive polymer and the first alignment layer and the second alignment layer may be formed by photo irradiation.

In an exemplary embodiment of the present invention, the pixel electrode includes: a first portion aligned in a first direction; a second portion crossing the first portion and aligned in a second direction substantially perpendicular to the first direction; and two or more third portions substantially parallel to each other and disposed obliquely between the first portion and the second portion.

The third portions are apart from each other by less than about 6 µm.

A width of at least one of the two or more third portions is less than about 6 µm.

In an exemplary embodiment of the present invention, widths of each of the two or more third portions are equal.

In an alternative exemplary embodiment of the present invention, widths of each of the two or more third portions are different.

In an alternative exemplary embodiment of the present invention, widths of the two or more third portions vary gradually.

In an exemplary embodiment of the present invention, at least one of the first alignment layer and the second alignment layer has a plurality of alignment regions, and each of the alignment regions has a different alignment direction in each of the domains.

In an exemplary embodiment of the present invention, at least one of the first alignment layer and the second alignment layer forms four or more domains of the plurality of domains in which the liquid crystal molecules are pretilted in different directions. Further, the four or more domains form a single domain group and the single domain group corresponds to the pixel region.

In an alternative exemplary embodiment of the present invention, the pixel electrode comprises a main body portion, and the micro slits are placed outside the main body portion and the pixel electrode includes one or more transverse and vertical portions extended from the main body portion, and a plurality of slant portions extended from one among the main body portion, the transverse portion and the vertical portion.

In an alternative exemplary embodiment of the present invention, the transverse portion and the vertical portion of the micro slit pattern have lengths of 10 μm or more, respectively.

In an alternative exemplary embodiment of the present invention, a display device includes: a first panel having a pixel region, a thin film transistor, a first pixel electrode disposed in the pixel region and connected to the thin film transistor, and a second pixel electrode disposed in the pixel region and connected to the thin film transistor through a coupling capacitor; a second panel facing the first panel and having a common electrode; a liquid crystal layer interposed between the first panel and the second panel, the liquid crystal layer having vertically aligned liquid crystal molecules; a first alignment layer disposed on the first pixel electrode and the second pixel electrode; and a second alignment layer disposed on the common electrode.

At least one of the first pixel electrode, the second pixel electrode, and the common electrode has a plurality of micro slits to form a plurality of domains.

The liquid crystal molecules are pretilted by an aligning force induced by the first alignment layer and the second alignment layer and an average direction of the liquid crystal molecules is substantially parallel to an extending direction of the micro slits within each of the domains when the pretilted liquid crystal molecules are projected on the first panel In an exemplary embodiment of the present invention, the common electrode may be slitless.

In an exemplary embodiment of the present invention, the first alignment layer and the second alignment layer may include a photo sensitive polymer and the first alignment layer and the second alignment layer may be formed by photo irradiation.

The first pixel electrode and the second pixel electrode include: a first portion aligned in a first direction; a second portion crossing the first portion and aligned in a second direction substantially perpendicular to the first direction; and two or more third portions substantially parallel to each other and disposed obliquely between the first portion and to the second portion.

In yet another alternative exemplary embodiment of the present invention, a display device includes: a first panel having a pixel region, a first thin film transistor, a second thin film transistor, a first pixel electrode disposed in the pixel region and connected to the first thin film transistor, and a second pixel electrode disposed in the pixel region and connected to the second thin film transistor; a second panel facing the first panel and having a common electrode; a liquid crystal layer interposed between the first panel and the second panel, the liquid crystal layer having vertically aligned liquid crystal molecules; a first alignment layer disposed on the first pixel electrode and the second pixel electrode; and a second alignment layer disposed on the common electrode.

At least one of the first pixel electrode, the second pixel electrode, and the common electrode has a plurality of micro slits to form a plurality of domains.

The liquid crystal molecules are pretilted by an aligning force induced by the first alignment layer and the second alignment layer and an average direction of the liquid crystal molecules is substantially parallel to an extending direction of the micro slits within each of the domains when the pretilted liquid crystal molecules are projected on the first panel In an exemplary embodiment of the present invention, the common electrode may be slitless.

In an exemplary embodiment of the present invention, the first alignment layer and the second alignment layer may include a photo sensitive polymer and the first alignment layer and the second alignment layer may be formed by photo irradiation.

The first pixel electrode and the second pixel electrode include: a first portion aligned in a first direction; a second portion crossing the first portion and aligned in a second direction substantially perpendicular to the first direction; and two or more third portions substantially parallel to each other and disposed obliquely between the first portion and to the second portion.

In still another alternative exemplary embodiment of the present invention, a display device includes: a first panel having a pixel region, a pixel electrode disposed in the pixel region, a first side of the pixel electrode being formed at one of an obtuse angle and an acute angle with respect to an adjacent second side of the pixel electrode; a second panel facing the first panel and having a common electrode; a liquid crystal layer interposed between the first panel and the second panel, the liquid crystal layer having vertically aligned liquid crystal molecules; a first alignment layer disposed on the pixel electrode; and a second alignment layer disposed on the common electrode.

At least one of the pixel electrode and the common electrode has a plurality of micro slits.

At least one of the first alignment layer and the second alignment layer is formed to have a plurality of pretilt directions.

A main planar direction of the micro slits substantially parallel to a direction of summed horizontal components of a pretilt direction of the at least one of the first alignment layer and the second alignment layer within the domain.

The first side of the pixel electrodes may include at least one bent part.

In an exemplary embodiment of the present invention, the common electrode may be slitless.

In an exemplary embodiment of the present invention, the first alignment layer and the second alignment layer may include a photo sensitive polymer and the pretilt directions may be determined by photo alignment method.

The pixel electrode includes: a first portion aligned in a first direction; a second portion crossing the first portion and aligned in a second direction substantially perpendicular to the first direction; and two or more third portions substantially parallel to each other and disposed obliquely between the first portion and the second portion.

In still an alternative exemplary embodiment of the present invention, a method of manufacturing a display device includes: forming a first panel having a pixel electrode; forming a second panel facing the first panel and having a common electrode; forming a first alignment layer on the first panel; forming a second alignment layer on the second panel; interposing a liquid crystal layer having vertically aligned liquid crystal molecules between the first panel and the second panel; forming a micro slit pattern on at least one of the pixel electrodealignment layer and the common electrodealignment layer; dividing the pixel electrode into a plurality of domains using at least one of the first alignment layer and the second alignment layer; and pretilting the vertically aligned liquid crystal molecules using a pretilt direction of the at least one of the first alignment layer and the second alignment layer corresponding to a domain of the plurality of domains such that a direction of summed horizontal components of a fringe field at an edge of the pixel region is substantially equal to a direction of summed horizontal components of a pretilt direction of the at least one of the first alignment layer and the second alignment layer within the domain.

The pretilt direction of the at least one of the first alignment layer and the second alignment layer may be manufactured by a photo alignment method including an exposure process using a mask.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
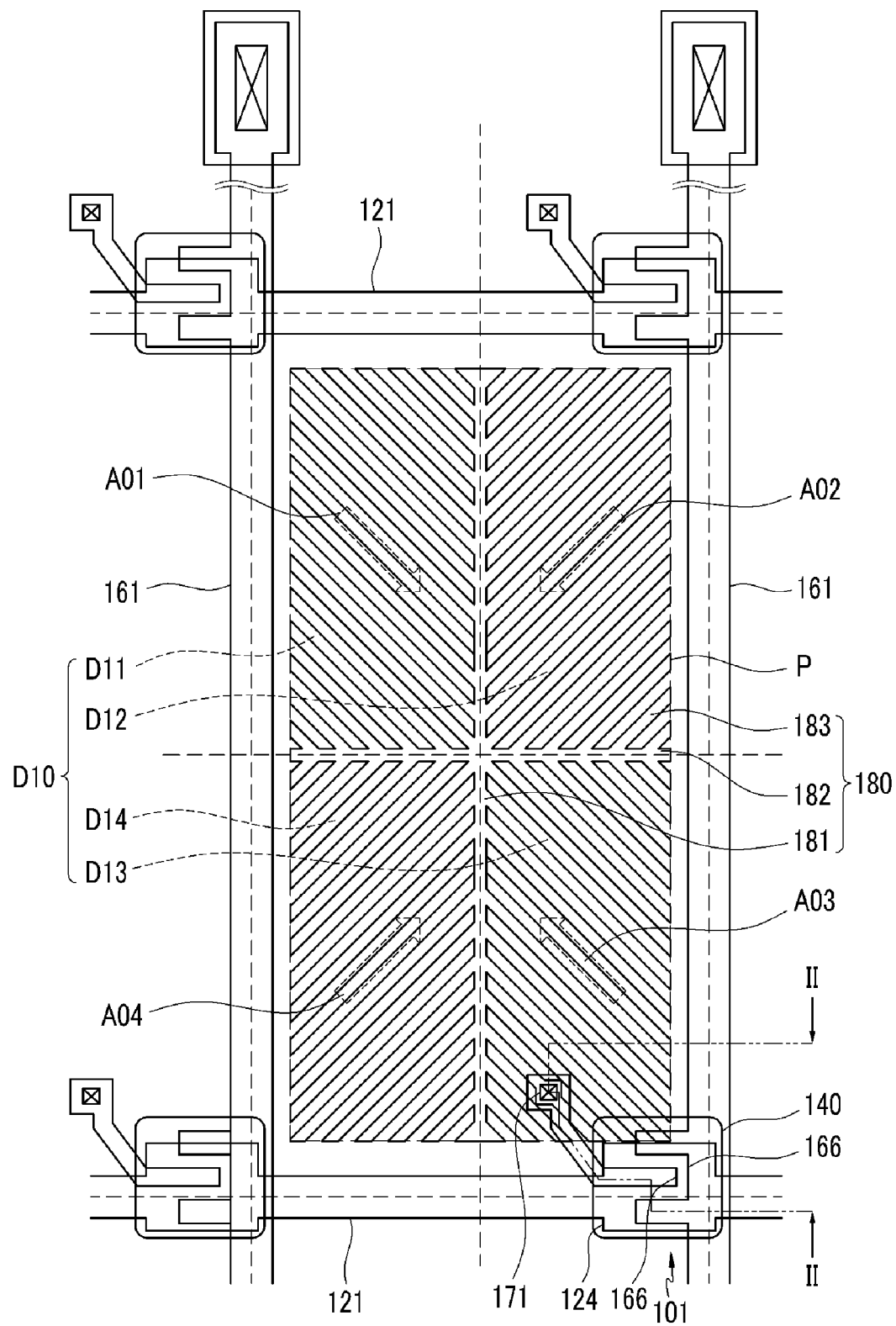
FIG. 1 is a plan view layout of a display device according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be explained in further detail with reference to the accompanying drawings.

It will be noted that although a display panel using amorphous silicon ("a-Si") formed through a 5-mask process is described herein in reference to exemplary embodiments of the present invention, alternative exemplary embodiments of the present invention may are not limited thereto.

Further, the drawings illustrate exemplary embodiments of the present invention in which a vertically aligned ("VA") mode liquid crystal display ("LCD") panel wherein one pixel is divided in plural domains and one pixel refers to a minimum unit for displaying an image, but alternative exemplary embodiments are not limited thereto.

The same or similar components are referred to by the same reference numerals, and repetitive descriptions thereof have therefore been omitted hereinafter.

Figure 2:
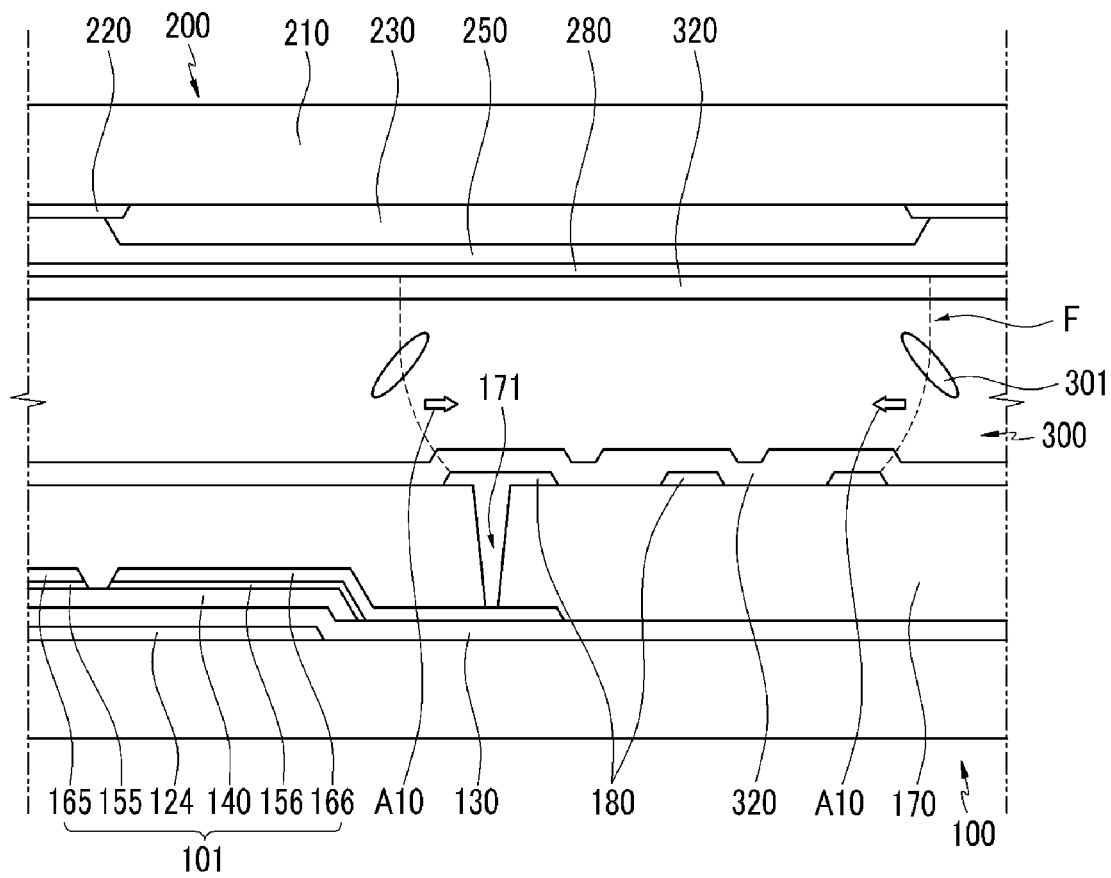
FIG. 2 is a partial cross-sectional view taken along line II-II' of the display device according to the exemplary embodiment of the present invention in FIG. 1.

FIG. 1 is a plan view layout of a display device according to an exemplary embodiment of the present invention. FIG. 2 is a partial cross-sectional view taken along line II-II' of the display device according to the exemplary embodiment of the present invention in FIG. 1;

As shown in FIG. 1 and FIG. 2, a display device 901 includes a first panel 100, a second panel 200, a first alignment layer 310, a second alignment layer 320 and a liquid crystal layer 300.

The first panel 100 includes a first substrate member 110, a thin film transistor 101 and a pixel electrode 180. In exemplary embodiment, the pixel electrode 180 has a plurality of micro slits, as shown in FIG. 1 and discussed in further detail below. The first panel 100 further includes a gate line 121 and a data line 161.

A structure of the first panel 100 will now be described in further detail with respect to FIGS. 1 and 2.

The first substrate member 110 is formed of a transparent material such as glass, quartz, ceramic or plastic, for example, but is not limited thereto.

The gate line 121 has a gate electrode 124 branching from the gate line 121. The gate line 121 and the gate electrode 124 are formed on the first substrate member 110. The gate line 121 and/or the gate electrode 124 may further include a first storage electrode line (not shown).

The gate line 121 and the gate electrode 124 are formed from a metal such as Al, Ag, Cr, Ti, Ta, Mo or an alloy thereof, for example but are not limited thereto. Although the gate line 121 and the gate electrode 124 are shown as having a monolayer structure in FIG. 2, the gate line 121 and/or the gate electrode 124 may be formed as a multilayer structure including a first metal layer (not shown) such as Cr, Mo, Ti, Ta or an alloy thereof, and a second metal layer (not shown) having a low electrical resistance such as a metal from Al group and Ag group metals, for example, but are not limited thereto in alternative exemplary embodiments of the present invention. Alternatively, the gate line 121 and/or the gate electrode 124 may be formed with other metals or conductors. In an exemplary embodiment, the multilayer structure is patterned with a common etching process, for example, but is not limited thereto.

A gate insulating layer 130 made of silicon nitride ("SiNx"), for example, is formed on the gate line 121 and the gate electrode 124.

The data line 161, a source electrode 165 and a drain electrode 166 are formed on the gate insulating layer 130, as shown in FIG. 2. The data line 161 crosses the gate line 121, as shown in FIG. 1. The source electrode 165 branches from the data line 161 and the drain electrode 166 is separately disposed from the source electrode 165, as shown in FIGS. 1 and 2. Though not shown, the data line 161, the source electrode 165 and/or the drain electrode 166 may further include a second storage electrode line (not shown). The first storage electrode line (not shown) and the second storage electrode form a capacitor (not shown).

The data line 161, the source electrode 165 and the drain electrode 166, like the gate line 121 and the gate electrode 124, are formed from a conducting materials such as Cr, Mo, Al or an alloy thereof, for example, and may also be formed as either a monolayer structure or a multilayer structure, as described above in greater detail.

A semiconductor layer 140 is formed on the gate insulating layer 130 above the gate electrode 124 and below the source electrode 165 and the drain electrode 166, as shown in FIG. 2. As a result, three electrodes, e.g., the gate electrode 124, the source electrode 165 and the drain electrode 166, of the thin film transistor 101 are thereby configured. Further, a channel region (not labeled) of the thin film transistor 101 is formed at the semiconductor layer 140 between the source electrode 165 and the drain electrode 166.

Ohmic contact members 155 and 156 are formed between the semiconductor layer 140 and the source electrode 165, and between the semiconductor layer 140 and the drain electrode 166 to reduce a contact resistance therebetween. In an exemplary embodiment, the ohmic contact members 155 and 156 are made of amorphous silicon highly doped with n-type impurities, for example, but are not limited thereto.

A passivation layer 170 made of a low dielectric insulator such as a-Si:C:O or a-Si:O:F, for example, or an inorganic insulator such as silicon nitride or silicon oxide ("SiOx"), for example, is formed on the data line 161, the source electrode 165 and the drain electrode 166 by a process such as plasma enhanced chemical vapor deposition ("PECVD"), for example.

A plurality of the pixel electrodes 180 is formed on the passivation layer 170. The pixel electrode 180 is made of a transparent conductive material such as indium tin oxide ("ITO") or indium zinc oxide ("IZO"), for example.

Further, a plurality of contact holes 171, each exposing a portion of the drain electrode 166, is formed in the passivation layer 170, as shown in FIG. 2. Thus, the pixel electrode 180 and the drain electrode 166 are electrically connected through an associated contact hole 171.

The pixel electrode 180 has a plurality of micro slits. More specifically, the pixel electrode 180 includes a vertical portion 181 aligned in a first direction, a transverse portion 182 crossing the vertical portion 181 and aligned in a second direction substantially perpendicular to the first direction, and two or more slant portions 183, that are divided by the micro slits. As shown in FIG. 1, the slant portion 183 extends obliquely from the vertical portion 181 and the transverse portion 182, e.g., at a slant with respect to the first direction and/or the second direction. Although a single vertical portion 181 and a single transverse portion 182 are shown in FIG. 1, alternative exemplary embodiments of the present invention are not limited thereto.

In an exemplary embodiment, a width of each of the vertical portion 181, the transverse portion 182 and the slant portion 183 is less than about 6 μm. Further, a gap between adjacent slant portions 183 is less than about 6 μm in an exemplary embodiment. In an alternative exemplary embodiment, the width of each of the vertical portion 181, the transverse portion 182 and the slant portion 183, as well as the gap between the adjacent slant portions 183 may be smaller, e.g., less than about 3 μm, but not being limited thereto. In addition, the width of each of the vertical portion 181, the transverse portion 182 and the slant portion 183, as well as the gap between the adjacent slant portions 183 is formed according to a predetermined transmittance ratio of light and/or a desired response characteristic of liquid crystal molecules 301 (FIG. 2), for example.

In an exemplary embodiment of the present invention, the width of the slant portion 183 is uniform, e.g., substantially equal, but alternative exemplary embodiments of the present invention are not limited thereto.

In an exemplary embodiment of the present invention, a ratio of an area of a portion in which the pixel electrode 180, divided by the micro slits, is formed in one pixel region to the total area of the pixel region may be 1 and more than. That is to say, the area of a portion in which the pixel electrode 180, divided by the micro slits, is formed in one pixel region is larger than an area of the cut-off region in the pixel electrode 180.

The micro slits of the pixel electrode 180 are formed as described above such that the liquid crystal molecules 301 in the liquid crystal layer 300 are more effectively pretilted.

Still referring to FIGS. 1 and 2, a second substrate member 210 and a common electrode 280 formed on the second substrate member 210 are included in the second panel 200. As shown in FIG. 2, the common electrode 280 is formed on a surface of the second substrate member 210 facing the first panel 100. A light blocking member 220, a color filter 230 and an overcoat layer 250 are further included in the second panel 200.

The second panel 200 will now be described in further detail with reference to FIGS. 1 and 2.

The second substrate member 210 is formed of a transparent material such as glass, quartz, ceramic or plastic, for example, but is not limited thereto.

The light blocking member 210 is formed on the second substrate member 220. The light blocking member 210 has an opening facing the pixel electrode 180 of the first panel 100 and blocks light from leaking between adjacent pixels (not labeled). More specifically, the light blocking member 220 is formed at a location corresponding to the thin film transistor 101 to block an external light which may be incident to the semiconductor layer 140 of the thin film transistor 101.

In an exemplary embodiment, the light blocking member 220 is made of a photoresistive material having a pigment of black color, for example. In an exemplary embodiment, carbon black or titanium oxide, for example, may be used as the pigment, but alternative exemplary embodiments are not limited thereto.

Respective color filters 230 of a plurality of the color filters 230 include primary colors, e.g., red, green and blue, and are sequentially arranged. Colors of the color filter are not limited to the primary colors and may be alternatively configured. A portion of each color filter 230 is disposed on the light blocking member 220, but alternative arrangements are not limited thereto. The portion of the color filter 230 which is disposed on a corresponding light blocking member 220, e.g., which overlaps the corresponding light blocking member 220, blocks light which may leak. Thus, in a case wherein a portion of a color filter 230 overlaps the light blocking member 220, a portion of the light blocking member 220 formed along a corresponding pixel boundary may be omitted.

The overcoat layer 250 is formed on the light blocking member 220 and the color filter 230. The overcoat layer 250 protects the color filter 230 and provides planar surface thereon. The overcoat layer 250 may be omitted in alternative exemplary embodiments.

The common electrode 280 is formed on the overcoat layer 250 and creates an electric field with the pixel electrode 180. In an exemplary embodiment, the common electrode 280 is made of transparent conductive material such as ITO or IZO.

In alternative exemplary embodiments, the first panel 100 and the second panel 200 are not limited to the structures described above.

Referring to FIG. 2, the liquid crystal layer 300 having the liquid crystal molecules 301 is disposed between the first panel 100 and the second panel 200. Here, the cell gap between the first panel 100 and the second panel 200 may be about 3.5 μm to about 4.5 μm.

Further, the first alignment layer 310 is disposed on the pixel electrode 180 and the second alignment layer 320 is disposed on the common electrode 280. Thus, more specifically, the liquid crystal layer 300 is disposed between the first alignment layer 310 and the second alignment layer 320, as shown in FIG. 2. The liquid crystal molecules 301 in the liquid crystal layer 300 are vertically aligned vertical and pretilted by an aligning force induced by the first alignment layer 310 and/or the second alignment layer 320.

In addition, at least one of the first alignment layer 310 and the second alignment layer 320 is formed to have a plurality of alignment regions having a different alignment direction by an inclined exposure method. Accordingly, the first alignment layer 310 and the second alignment layer 320 controls an alignment direction of liquid crystal molecules by radiating light. As a result, the liquid crystal molecules 301 in the liquid crystal layer 300 are pretilted in a plurality of pretilt directions. As described later in greater detail, the pixel electrode 180 having the micro slits together with at least one of the first alignment layer 310 and the second alignment layer 320 pretilt the liquid crystal molecules 301 of the display device 901 according to an exemplary embodiment of the present invention more effectively.

Still referring to FIGS. 1 and 2, at least one of the first alignment layer 310 and the second alignment layer 320 divides the pixel region P into a single domain group D10 having a first domain D11, a second domain D12, a third domain D13 and a fourth domain D14. The pretilt directions of the respective liquid crystal molecules 301 in the first domain D11, the second domain D12, the third domain D13 and the fourth domain D14 corresponding to the pixel region P are different from each other, as described in further detail later.

When a voltage is not applied between the pixel electrode 180 and the common electrode 280, e.g., when an electric field does not exist therebetween, the liquid crystal molecules 301 in the liquid crystal layer 300 are vertically aligned by the first alignment layer 310 and/or the second alignment layer 320. More specifically, when at least one of the first alignment layer 310 and the second alignment layer 320 has a pretilt direction, the vertically aligned liquid crystal molecules 301 are pretilted by inclining the vertically aligned liquid crystal molecules 301 along a corresponding pretilt direction of the first alignment layer 310 and/or the second alignment layer 320. Hereinafter, A pretilt means an inclination of the vertically aligned liquid crystal molecules 301 by a predetermined angle, and a pretilt direction refers to a direction along which the liquid crystal molecules 301 are pretilted with respect to a surface of the first alignment layer 310 and/or the second alignment layer 320, e.g., in an inclined direction with respect to the first alignment layer 310 and/or the second alignment layer 320. Further, the liquid crystal molecules 301 are inclined along the pretilt direction with respect to a vertical direction at a respective surface of the first alignment layer 310 and/or the second alignment layer 320. More specifically, the liquid crystal molecules 301 are aligned by the first alignment layer 310 and/or the second alignment layer 320 and are thereby inclined at an angle in a range of approximately 0.1 degrees to approximately 2 degrees with respect to the vertical direction from the surface of the respective first substrate member 110 and the second substrate member 210. Put another way, the liquid crystal molecules 301 in a given domain of the first domain D11, the second domain D12, the third domain D13 and the fourth domain D14 are substantially vertically aligned but slightly inclined in a corresponding pretilt direction.

By pretilting the liquid crystal molecules 301 of each of the first domain D11, the second domain D12, the third domain D13 and the fourth domain D14 in predetermined direction, the liquid crystal molecules 301 are vertically aligned in a constant direction in a given domain of the first domain D11, the second domain D12, the third domain D13 and the fourth domain D14 when an electric field is applied between the pixel electrode 180 and the common electrode 280. Accordingly, a response speed and a display characteristic such as a viewing angle, for example, of the display device 901 according to an exemplary embodiment of the present invention are effectively enhanced.

According to an exemplary embodiment of the present invention, the first alignment layer 310 together with the second alignment layer 320 divides the pixel electrode 180 in the pixel region P into the single domain group D10 having the first domain D11, the second domain D12, the third domain D13 and the fourth domain D14. More specifically, boundary lines of the first domain D11, the second domain D12, the third domain D13 and the fourth domain D14 divided by the first alignment layer 310 and/or the second alignment layer 320 are shown by a dotted lines in FIG. 1. In addition, the first domain D11, the second domain D12, the third domain D13 and the fourth domain D14 are each further divided by the vertical portion 181 and the transverse portion 182 of the pixel electrode 180. More specifically, the first alignment layer 310 and the second alignment layer 320 each have at least two alignment regions having different pretilt directions. Thus, the first domain D11, the second domain D12, the third domain D13 and the fourth domain D14 each have liquid crystal molecules 301 pretilted in different directions, as described later in further detail with respect to FIGS. 3-5. More specifically, pretilt directions of each of the first domain D11, the second domain D12, the third domain D13 and the fourth domain D14 are formed by a combination of a first alignment region E11 and a second alignment region E12 (FIG. 4) of the first alignment layer 310, and/or a third alignment region E23 and a fourth alignment region E24 (FIG. 5) of the second alignment layer 320. Further, a pretilt direction of the liquid crystal molecules 301 in a given domain of the first domain D11, the second domain D12, the third domain D13 and the fourth domain D14 is substantially equal to a summed direction of horizontal components of the pretilt direction of each of the first alignment layer 310 and the second alignment layer 320. Hereinafter, horizontal component direction refers to a direction substantially parallel to facing surfaces of the first panel 100 and the second panel 200. Further, a longitudinal direction of the slant portion 183 of the pixel electrode 180, which is determined by the micro slits and parallel to a main direction of the micro slits, is substantially equal to the summed direction of horizontal components of the pretilt direction of the respective first alignment layer 310 and/or the second alignment layer 320. In an exemplary embodiment, a difference in the longitudinal direction of the slant portion 183 of the pixel electrode 180 formed by the micro slits of the pixel electrode 180 and the summed direction of horizontal components of the pretilt direction of the respective first alignment layer 310 and/or the second alignment layer 320 may be in a range of approximately 5 degrees of each other.

In an exemplary embodiment, the liquid crystal molecules 301 are pretilted along a pretilt direction of at least one of the first alignment layer 310 and the second alignment layer 320, depending upon which of the first alignment layer 310 and/or the second alignment layer 320 has a pretilt direction. Thus, the first domain D11, the second domain D12, the third domain D13 and the fourth domain D14 may each be distinguished only by the respective alignment layer of the first alignment layer 310 and/or the second alignment layer which has the pretilt direction. Therefore, if one of the first alignment layer 310 and the second alignment layer 320 does not have a pretilt direction, e.g., does not pretilt the liquid crystal molecules 301, the corresponding alignment layer has no horizontal direction component in the pretilt direction.

As described above, a single domain group D10 includes the first domain D11, the second domain D12, the third domain D13 and the fourth domain D14 which respectively pretilt the liquid crystal molecules 301 in different directions within a given domain of the first domain D11, the second domain D12, the third domain D13 and the fourth domain D14. In other words, the first alignment layer 310 and/or the second alignment layer 320 forms the first domain D11, the second domain D12, the third domain D13 and the fourth domain D14 which pretilt the liquid crystal molecules 301 in different directions from each other, and the first domain D11, the second domain D12, the third domain D13 and the fourth domain D14 form the single domain group D10. As shown in FIG. 1, the single domain group D10 corresponds to the pixel region P.

When a voltage is applied between the pixel electrode 180 and the common electrode 280, fringe fields F form in a substantially vertical direction with respect to the pixel electrode 180 and the common electrode 280 at edges of the pixel electrode 180 and the common electrode 280, as shown in FIG. 2. An entire surface of the second substrate member 210 is covered with the common electrode 280 while cut-off regions exist in the pixel electrode 180 since the pixel electrode 180 is separated on the on the first panel 100, e.g., each pixel region P has the micro slits.

In an exemplary embodiment, the cut-off regions are each intentionally formed by the micro slits to pretilt the liquid crystal molecules 301 in predetermined direction. However, cut-off regions between pixel electrodes 180 disposed in different pixel regions P are not desired, since these cut-off regions produce the fringe field F at edges of the pixel electrode 180, as shown in FIG. 2. More specifically, the fringe field F is not vertical to the pixel electrode 180 but instead curves toward an inner portion of the pixel electrode 180, as illustrated in FIG. 2. Further, a horizontal component direction of the fringe field F produced at edges of the pixel electrode 180 is in a fringe field direction A10 in FIG. 2 and FIG. 3. Since the vertically aligned liquid crystal molecules 301 are disposed in a direction substantially vertical to an applied electrical field, the liquid crystal molecules 301 disposed at the edges of the pixel region P orient in a direction different from an intended direction, e.g., a pretilt direction of the liquid crystal molecules 301 of the first domain D11, the second domain D12, the third domain D13 and the fourth domain D14, due to the fringe field F produced at the edges of the pixel region P shown in FIG. 2. Thus, liquid crystal molecules 301 disposed at the edges of the pixel region P incline not in the desired pretilt direction of the corresponding domain but rather in the horizontal component direction of the fringe field F, e.g., the fringe field direction A10, at the edges of the pixel region P. As a result, collisions and interference occurs between the liquid crystal molecules 301 at the edges of the pixel region P.

Accordingly, the collisions and interference between the liquid crystal molecules 301 at the edges of the pixel region P can be minimized if the direction of the summed horizontal components of the fringe field F produced at the edges of the pixel region P are substantially equal to the pretilt direction of the liquid crystal molecules 301 in the corresponding domain of the first domain D11, the second domain D12, the third domain D13 and the fourth domain D14. More specifically, it is desired that the liquid crystal molecules are pretilt in a first pretilt direction A01, a second pretilt direction A02, a third pretilt direction A03 and a fourth pretilt direction A04 corresponding to the first domain D11, the second domain D12, the third domain D13 and the fourth domain D14, respectively, as shown in FIG. 1.

As a result, a texture, e.g., dark part caused by uncontrolled liquid crystal molecules 301, produced by collision of the liquid crystal molecules 301 is substantially reduced or effectively prevented in the display device 901 according to an exemplary embodiment of the present invention. Therefore, a viewing angle, a display characteristic and a manufacturing efficiency of the display device 901 are enhanced.

As shown in FIG. 1 and described herein, the pixel electrode 180 has the micro slits, but alternative exemplary embodiments of the present invention are not limited thereto. For example, the common electrode 280 and/or on the pixel electrode 180, alone or in combination may have the micro slits.

The fringe field F produced at edges of the pixel region P of each domain of the first domain D11, the second domain D12, the third domain D13 and the fourth domain D14, and the corresponding pretilt directions, e.g., the first pretilt direction A01, the second pretilt direction A02, the third pretilt direction A03 and the fourth pretilt direction A04 of the first alignment layer 310 and the second alignment layer 320 will now be described in further detail with reference to FIGS. 1-3.

Figure 3:
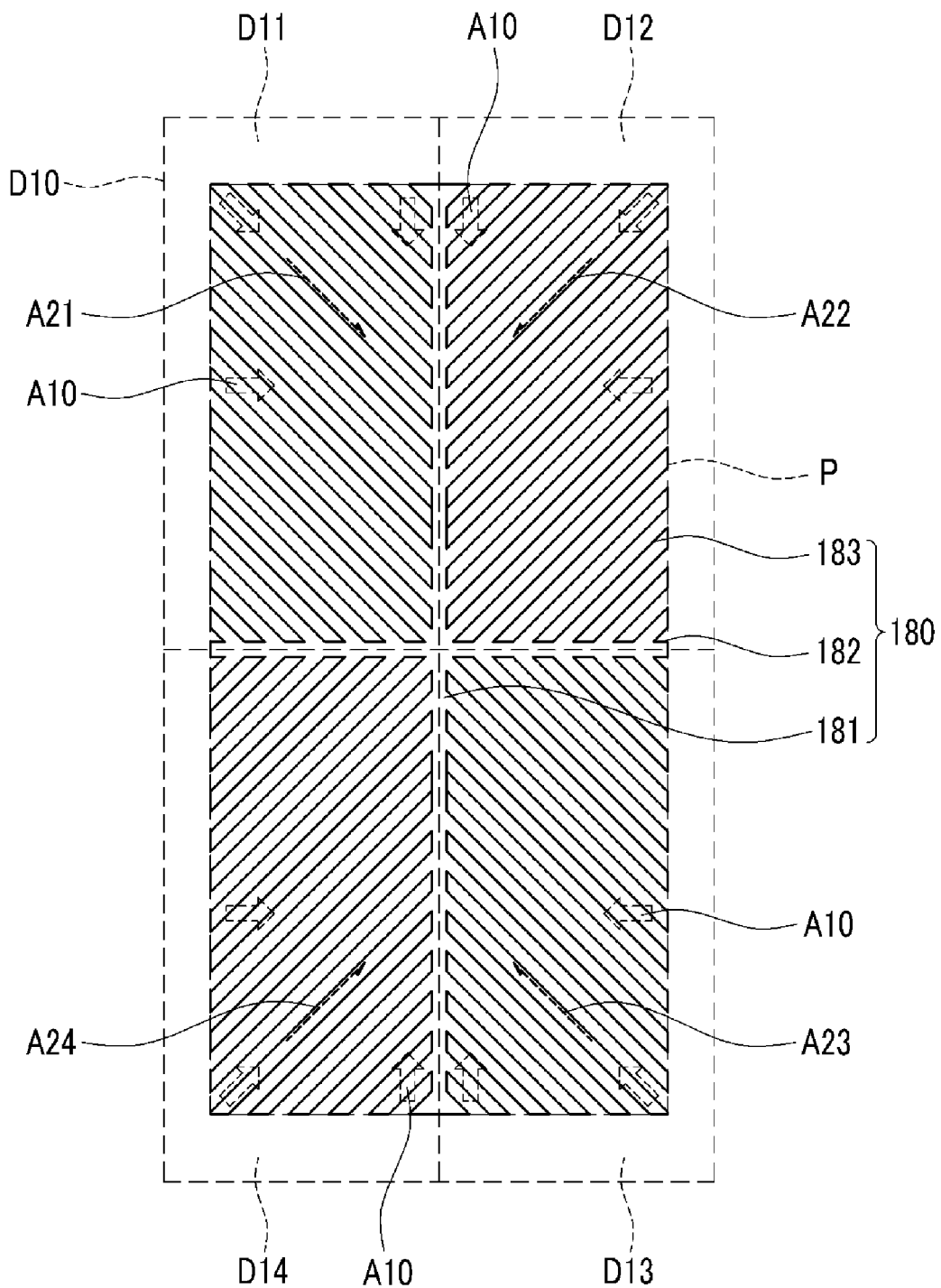
FIG. 3 is a plan view layout illustrating a fringe field direction produced at a pixel edge region of the display device according to the exemplary embodiment of the present invention in FIG. 1.

FIG. 3 is a plan view layout illustrating a fringe field direction produced at a pixel edge region of the display device according to the exemplary embodiment of the present invention in FIG. 1.

Referring to FIGS. 1-3, in the pixel electrode 180 having the micro slits, two kinds of the fringe field F which influence the pretilting direction of the liquid crystal molecules 301 in the liquid crystal layer 300 are produced, as described above in greater detail. More specifically, a fringe field F is intentionally produced at the slant portion 183 of the pixel electrode 180 while an undesired fringe field F is produced at edges of the pixel region P.

The fringe field F produced at the slant portion 183 of the pixel electrode 180 formed by the micro slits influences the liquid crystal molecules 301 pretilted by the first alignment layer 310 and/or the second alignment layer 320 to pretilt in an extending direction of the slant portion 183 in a respective domain of the first domain D11, the second domain D12, the third domain D13 and the fourth domain D14, as described above in greater detail. Thus the pretilt directions of the liquid crystal molecules 301 are substantially equal to the pretilt direction of each respective domain of the first domain D11, the second domain D12, the third domain D13 and the fourth domain D14 by the first alignment film 310 and/or the second alignment film 320. Accordingly, the liquid crystal molecules 301 are pretilted more effectively and in a stable manner.

The arrow of the fringe field direction A10 in FIGS. 2 and 3 represents a horizontal component direction of the associated fringe field F produced at a corresponding edge of the pixel region P, e.g., a direction in which the liquid crystal molecules 301 are arranged by the fringe field F. Further, the arrows of FIG. 3 indicate summed directions of the fringe field F horizontal components of respective domains of the first domain D11, the second domain D12, the third domain D13 and the fourth domain D14. More specifically, a first horizontal component direction A21, a second horizontal component A22, a third horizontal component A23 and a fourth horizontal component direction A24 correspond to the first domain D11, the second domain D12, the third domain D13 and the fourth domain D14, respectively. Although the horizontal component direction A10 of the fringe field F changes slightly depending upon a position of the fringe field F within the pixel region P, average pretilt directions of the liquid crystal molecules 301 in the respective domains by the fringe field F produced in the pixel region P are the most typical directions that the liquid crystal molecules 301 due to the fringe field F in the corresponding domains of the first domain D11, the second domain D12, the third domain D13 and the fourth domain D14.

As described above in greater detail, collisions between the liquid crystal molecules 301 are minimized by pretilting the liquid crystal molecules 301 by the first alignment layer 310 and/or the second alignment layer 320 such that the pretilt directions of respective liquid crystal molecules 301 are substantially parallel to the extending direction of the slant portion 183 of the pixel electrode 180 formed by the micro slits such that the liquid crystal molecules 301 can be pretilted more effectively and stably.

In more details, the liquid crystal molecules are pretilted by an aligning force induced by the first alignment layer 310 and/or the second alignment layer 320, and an average direction of the liquid crystal molecules is substantially parallel to the extending direction of the slant portion 183 of the pixel electrode 180 formed by the micro slits within each of the domains D11, D12, D13, and D14 when the pretilted liquid crystal molecules are projected on the first panel.

Figure 4:
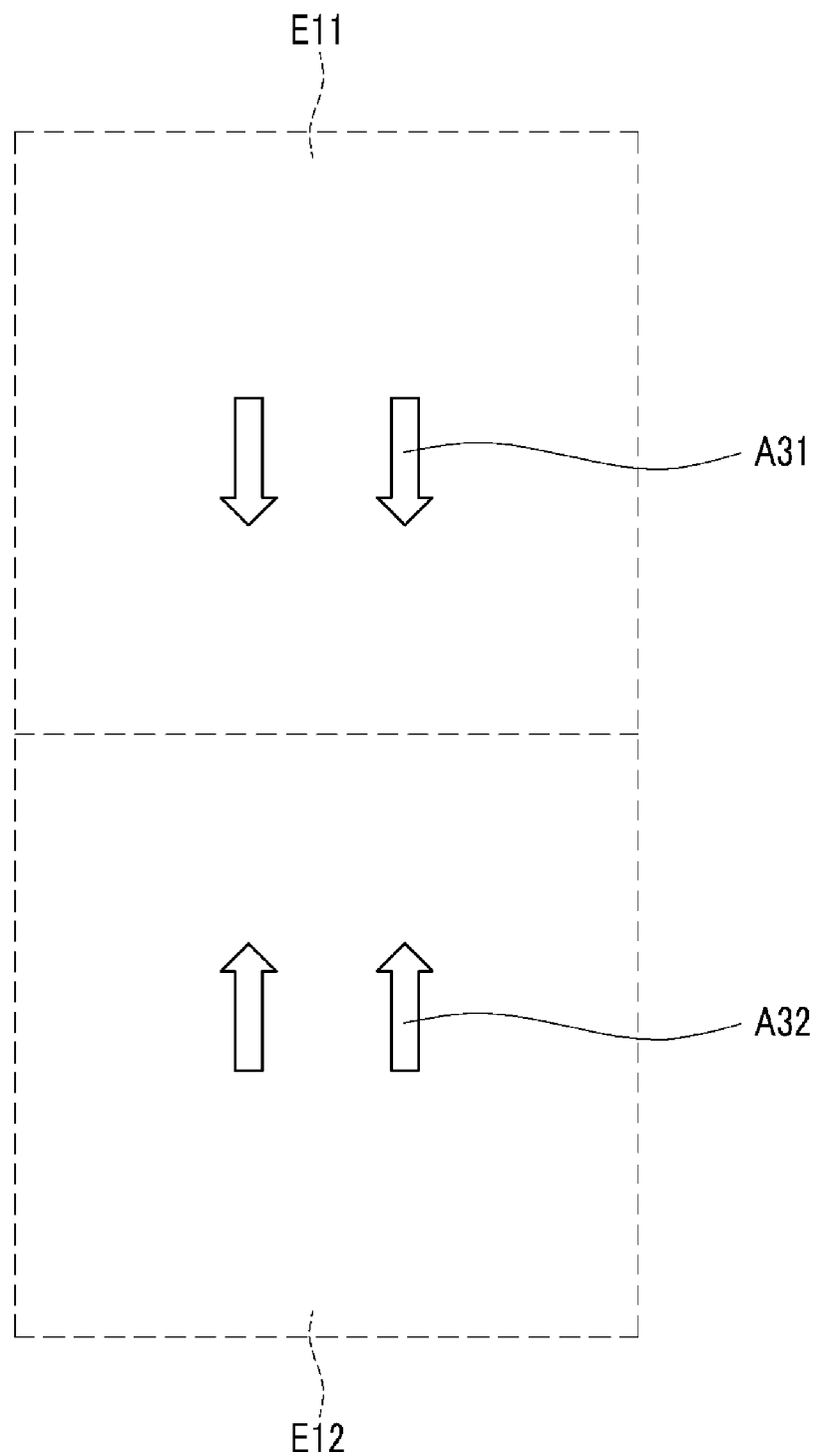
FIG. 4 is a plan view layout illustrating a pretilt direction of a first alignment layer the display device according to the exemplary embodiment of the present invention in FIG. 1.
Figure 5:
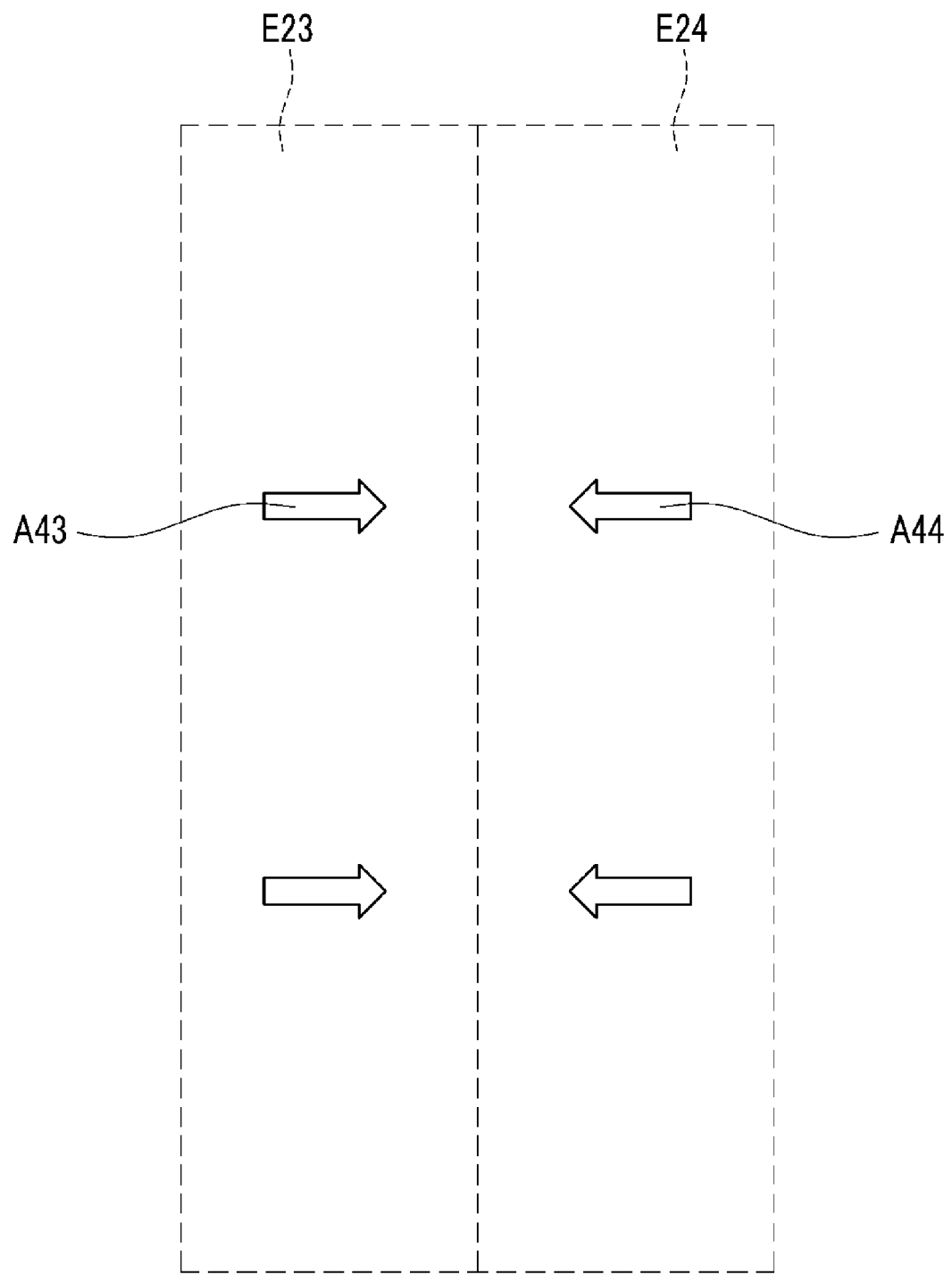
FIG. 5 is a plan view layout illustrating a pretilt direction of a second alignment layer the display device according to the exemplary embodiment of the present invention in FIG. 1.

FIG. 5 is a plan view layout illustrating a pretilt direction of a first alignment layer the display device according to the exemplary embodiment of the present invention in FIG. 1 and FIG. 4 is a plan view layout illustrating a pretilt direction of a second alignment layer the display device according to the exemplary embodiment of the present invention in FIG. 1.

Referring to FIGS. 4 and 5, a first alignment region E11 and a second alignment region E12, and corresponding first pretilt direction A31 and second pretilt direction A32, respectively, are formed on the first alignment layer 310 (FIG. 4). For example, the first alignment region E11 having the first pretilt direction A31 and the second alignment region E12 having the second pretilt direction A32 facing the first pretilt direction A31 are included in the first alignment layer 310. More specifically, the pixel region P including the pixel electrode 180 is divided along a longitudinal direction of the pixel region, P e.g., the first alignment region E11 and the second alignment region E12 are divided within the first alignment layer 310.

Referring to FIG. 5, a third alignment region E23 and a fourth alignment region E24, and corresponding third pretilt direction A43 and fourth pretilt direction A44, respectively, are formed on the second alignment layer 320. For example, the third alignment region E23 having the third pretilt direction A43 crossing the first pretilt direction A31 and the second pretilt direction A32 (FIG. 4) and the fourth alignment region E24 having the fourth pretilt direction A44 facing the third pretilt direction A43 are included in the second alignment layer 320. Thus, the pixel region P including the pixel electrode 180 is divided along the lateral direction of the pixel region P, and the third alignment region E23 and the fourth alignment region E24 are divided within the second alignment layer 320.

Thus, the first pretilt direction A31 and the second pretilt direction A32 in the first alignment layer 310 are opposite and facing each other, while the third pretilt direction A43 and the fourth pretilt direction A44 in the second alignment layer 320 are opposite and facing each other. The first pretilt direction A31 and the second pretilt direction A32 in the first alignment layer 310 and the third pretilt directions A43 and the fourth pretilt direction A44 in the second alignment layer 320 cross each other, as shown in FIGS. 4 and 5.

Further, the respective pretilt directions of the first alignment layer 310 and the second alignment layer 320 are directed substantially inward, e.g., from edges of the pixel region P toward a center region thereof.

In an exemplary embodiment of the present invention, the first alignment layer 310 and the second alignment layer 320 are manufactured using a photo alignment method, for example. The alignment layer 310 and the second alignment layer 320 may include a photo sensitive polymer and the photo sensitive polymer is be harden by an exposure process. The photo alignment method includes an exposure process using a mask. Further, ultra violet ("UV") light may be used in the exposure process. Additionally, an inclined exposure method may be used for the exposure process, for example, but is not limited thereto. For example, exposure methods may include inclining a substrate and a light source, and partially exposing the substrate using a lens or reflection plate.

Further, in an exemplary embodiment, the first alignment layer 310 divided by the first alignment region E11 and the second alignment region E12, and the second alignment layer 320 divided by the third alignment region E23 and the fourth alignment region E24 are formed consecutively. For example, the first alignment layer 310 and the second alignment layer 320 are made using a two exposure processes using the mask. The light alignment method may include a variety of known methods, and alternative exemplary embodiments of the present invention are not limited to those methods described herein.

Referring again to FIGS. 3-5, the first domain D11 is formed by overlapping the first alignment region E11 of the first alignment layer 310 and the third alignment region E23 of the second alignment layer 320. The second domain D12 is formed by overlapping the first alignment region E11 of the first alignment layer 310 and the fourth alignment region E24 of the second alignment layer 320. The third domain D13 is formed by overlapping the second alignment region E12 of the first alignment layer 310 and the third alignment region E23 of the second alignment layer 320. Finally, the fourth domain D14 is formed by overlapping the second alignment region E12 of the first alignment layer 310 and the fourth alignment region E24 of the second alignment layer 320.

Accordingly, liquid crystal molecules 301 in the first domain D11 are pretilted to be vertically aligned in a direction of summed horizontal components of the first pretilt direction A31 and the third pretilt direction A43. Likewise, liquid crystal molecules 301 in the second domain D12 are pretilted to be vertically aligned in a direction of summed horizontal components of the first pretilt direction A31 and the fourth pretilt direction A44. Liquid crystal molecules 301 in the third domain D13 are pretilted to be vertically aligned in a direction of summed horizontal components of the second pretilt direction A32 and the third pretilt direction A43. Finally, liquid crystal molecules 301 in the fourth domain D14 are pretilted to be vertically aligned in a direction of summed horizontal components of the second pretilt direction A32 and the fourth pretilt direction A44.

In an exemplary embodiment, the pretilt of the first alignment layer 310 and the second alignment layer 320 are formed to be substantially equal to a direction of the summed horizontal components of the first pretilt direction A31 and the third pretilt direction A43 with the direction of the summed horizontal components of the corresponding fringe field F produced at the edge of the pixel region P in the first domain D11.

Similarly, the pretilt of the first alignment layer 310 and the second alignment layer 320 are formed to be substantially equal to the direction of the summed horizontal components of the first pretilt direction A31 and the fourth pretilt direction A44 with the direction of the summed horizontal components of the fringe field F produced at the edge of the pixel region P in the second domain D12.

Further, the pretilt of the first alignment layer 310 and the second alignment layer 320 are formed to be substantially equal the direction of the summed horizontal components of the second pretilt direction A32 and the third pretilt direction A43 with the direction of the summed horizontal components of the fringe field F produced at the edge of the pixel region P in the third domain D13.

Finally, the pretilt of the first alignment layer 310 and the second alignment layer 320 are formed to be substantially equal to the direction of the summed horizontal components of the second pretilt direction A32 and the fourth pretilt direction A44 with the direction of the summed horizontal components of the fringe field F produced at the edge of the pixel region P in the fourth domain D14.

Accordingly, directions of the respective summed horizontal components in the first pretilt direction A01, the second pretilt direction A02, the third pretilt direction A03 and the fourth pretilt direction A04 (FIG. 1) of the liquid crystal molecules 301 in the respective domains of the first domain D11, the second domain D12, the third domain D13 and the fourth domain D14 by the first alignment layer 310 and the second alignment layer 320 are substantially equal to the first horizontal component direction A21, the second horizontal component A22, the third horizontal component A23 and the fourth horizontal component direction A24 (FIG. 3) of the summed horizontal components of the corresponding fringe fields F produced at the corresponding edges of the pixel region P in respective domains of the first domain D11, the second domain D12, the third domain D13 and the fourth domain D14.

As described above, the liquid crystal molecules 301 are pretilted by an aligning force induced by the alignment layers 310 and 320, and an average direction of the liquid crystal molecules 301 is substantially parallel to an extending direction of the micro slits within each of the domains D11, D12, D13, and D14, when the pretilted liquid crystal molecules are projected on the first panel.

Though the single domain group D10 is shown in FIG. 1 in the pixel region P, alternative exemplary embodiments of the present invention are not limited thereto. For example, two or more domain groups D10 may be formed in single pixel region P.

As described above, in the display panel 901 according to an exemplary embodiment of the present invention, a viewing angle, a display characteristic and a manufacturing efficiency are substantially improved.

More specifically, the direction of the summed horizontal components of the fringe field F produced at respective edges of the pixel region P in each domain of the first domain D11, the second domain D12, the third domain D13 and the fourth domain D14 substantially agrees with a direction of the summed horizontal components of the pretilt directions of first alignment layer 310 and the second alignment layer 320. In an exemplary embodiment, a range of approximately 5 degrees is permissible between the direction of the summed horizontal components of the fringe field F produced at the edge of the pixel region P and the direction of the summed horizontal components of the pretilt directions of respective domains of the first alignment layer 310 and the second alignment layer 320.

In an exemplary embodiment of the present invention, collisions between the liquid crystal molecules 301 at the edge of the pixel region P are substantially reduced or effectively minimized. Thus, a texture from the collisions of liquid crystal molecules 301 is substantially reduced or effectively minimized.

In addition, a separate pattern formed on the common electrode 280 to pretilt the liquid crystal molecules 301 in the liquid crystal layer 300 is not necessary since the liquid crystal molecules 301 are pretilted by the first alignment layer 310 and/or the second alignment layer 320 in exemplary embodiments of the present invention. Further, a manufacturing process of the display device 901 is simplified even more since a step of patterning the common electrode 280 is not necessary since a micro pattern is formed only in the pixel electrode 180. Also, the first alignment layer 310 and the second alignment layer 320 can be formed using the two exposure processes described above in greater detail, using their respective masks. Therefore, additional processes to pretilt the liquid crystal molecules 301 by the first alignment layer 310 and the second alignment layer 320 are minimized.

Finally, the liquid crystal molecules 301 are pretilted more effectively and stably using the fringe field F produced at the slant portion 183 of the pixel electrode 180 formed by the micro slits, as described above in greater detail.

A method of manufacturing the display device 901 according to an exemplary embodiment of the present invention will now be described in further detail. It will be noted that a manufacturing process of the first panel 100 and the second panel 200 is omitted, since the first panel 100 and the second panel 200 may be manufactured through any method of one having ordinary skill in the art.

The first alignment layer 310 is divided into at least the first alignment region E11 and the second alignment region E12 each aligned in different directions and is formed on the first panel 100 which includes the pixel electrode 180 having the micro slits. More specifically, the first alignment region E11 having the first pretilt direction A31 and the second alignment region E12 having the second pretilt direction A32 is included in the first alignment layer 310 as shown in FIG. 4.

The first alignment layer 310 is formed through photo alignment method, e.g., the exposure process using a mask as described above. First, a light alignment material is disposed on the pixel electrode 180 on the first panel 100. The light alignment material may be one of various known materials, for example. Ultra violet light is then irradiated on the first alignment region E11 to form the first pretilt direction A31, while the mask covers the second alignment region E12. Next, ultra violet light is irradiated on the second alignment region E12 to form the second pretilt direction A32 while the mask covers the first alignment region E11. Next, the first alignment layer 310 divided into the first alignment region E11 and the second alignment region E12 is formed, e.g., is divided in a lateral direction, e.g., into the first alignment region E11 and the second alignment region E12 in the first alignment layer 310 as shown in FIG. 4.

Thus, the second alignment layer 320 is divided into at least the third alignment region E23 and the fourth alignment region E24 each aligned in different directions and is formed on the second panel 200 which includes the common electrode 280. For example, the third alignment region E23 having the third pretilt direction A43 and the fourth alignment region E24 having the fourth pretilt direction A44 is included in the second alignment layer 320 as shown in FIG. 5.

The second alignment layer 320 is formed in a similar manner as the first alignment layer 310 is formed. First, a light alignment material is disposed on the common electrode 280 of the second panel 200. The light alignment material may be one of various known materials. Ultra violet light is irradiated on the third alignment region E23 to form the third pretilt direction A43 while the mask covers the fourth alignment region E24. Then, ultra violet light is irradiated on the fourth alignment region E24 to form the fourth pretilt direction A44 while the mask covers the third alignment region E23. Thus, the second alignment layer 320 is divided by the third alignment region E23 and the fourth alignment region E24 and is formed. The second alignment layer 320 is divided in a longitudinal direction, e.g., into the third alignment region E23 and the fourth alignment region E24 in the second alignment layer 320, as shown in FIG. 5.

Next, the first panel 100 whereon the first alignment layer 310 is formed and the second panel 200 whereon the second alignment layer 320 is formed are arranged to face each other and are then assembled. Next, the liquid crystal layer 300 including the liquid crystal molecules 301 is disposed between the first panel 100 and the second panel 200 to form the display device 901. Alternative exemplary embodiments of the present invention are not limited to the method described above. For example, after disposing the liquid crystal layer 300 on any one or both of the first panel 100 and/or the second panel 200, the first panel 100 and the second panel 200 may be assembled to face each.

The first alignment layer 310 and the second alignment layer 320 therefore divide the pixel region P into the first domain D11, the second domain D12, the third domain D13 and the fourth domain D14. The first domain D11, the second domain D12, the third domain D13 and the fourth domain D14 where the liquid crystal molecules 301 are pretilted in different directions are formed by a combination of the first alignment region E11 and the second alignment region E12 of the first alignment layer 310 and the third alignment region E23 and the fourth alignment region E24 of the second alignment layer 320. More specifically, the first domain D11 is formed by overlap of the first alignment region E11 of the first alignment layer 310 with the third alignment region E23 of the second alignment layer 320. The second domain D12 is formed by overlap of the first alignment region E11 of the first alignment layer 310 with the fourth alignment region E24 of the second alignment layer 320. The third domain D13 is formed by overlap of the second alignment region E12 of the first alignment layer 310 with the third alignment region E23 of the second alignment layer 320. Finally, the fourth domain D14 is formed by overlap of the second alignment region E12 of the first alignment layer 310 with the fourth alignment region E24 of the second alignment layer 320.

Liquid crystal molecules 301 in the liquid crystal layer 300 are vertically aligned by the first alignment layer 310 and the second alignment layer 320, and are pretilted in different directions, e.g., the first pretilt direction A01, the second pretilt direction A02, the third pretilt direction A03 and the fourth pretilt direction A04 according to the first domain D11, the second domain D12, the third domain D13 and the fourth domain D14, respectively. More specifically, the liquid crystal molecules 301 in the first domain D11 are pretilted to be aligned in a direction of summed horizontal components of the first pretilt direction A31 and the third pretilt direction A43. The liquid crystal molecules 301 in the second domain D12 are pretilted to be aligned in a direction of summed horizontal components of the first pretilt direction A31 and the fourth pretilt direction A44. The liquid crystal molecules 301 in the third domain D13 are pretilted to be aligned in a direction of summed horizontal components of the second pretilt direction A32 and the third pretilt direction A43. Finally, the liquid crystal molecules 301 in the fourth domain D14 are pretilted to be aligned in a direction of summed horizontal components summed of the second pretilt direction A32 and the fourth pretilt direction A44. Finally, the liquid crystal molecules 301 in the fourth domain D14 are pretilted to be aligned in a direction of the summed horizontal components of the second pretilt direction A32 and the fourth pretilt direction A44.

As a result, the first alignment layer 310 and the second alignment layer 320 are formed such that the liquid crystal molecules 301 are pretilted in the first horizontal component direction A21, the second horizontal component A22, the third horizontal component A23 and the fourth horizontal component direction A24 by corresponding fringe field F produced at a corresponding edge of the pixel region P substantially equal to the first pretilt direction A01, the second pretilt direction A02, the third pretilt direction A03 and the fourth pretilt direction A04.

Further, the pixel electrode 180 has the micro slits such that the pixel electrode 180 includes the vertical portion 181, the transverse portion 182 crossing the vertical portion 181 and two or more slant portions 183, as described above in greater detail.

According to the method of manufacturing the display device 901 as described above, the display device 901 has an enhanced viewing angle, improved display characteristic and increased manufacturing efficiency.

Further, as described above collisions between the liquid crystal molecules 301 is minimized by pretilting the liquid crystal molecules 301 by an angle substantially equal to an angle of the fringe field F produced at edges of the pixel region P by the first alignment layer 310 and/or the second alignment layer 320.

Additionally, a pattern formed on the common electrode 280 to pretilt the liquid crystal molecules 301 in the liquid crystal layer 300 is not necessary since the liquid crystal molecules 301 are vertically aligned as well as pretilted by the first alignment layer 310 and the second alignment layer 320. Accordingly, a manufacturing process of the display device 901 is further simplified. In addition, since the patterning of the common electrode 280 is not necessary since the micro pattern is formed in the pixel electrode 180, a manufacturing process is even further simplified. Also, the first alignment layer 310 and the second alignment layer 320 can be formed through the two exposure processes described above, eliminating additional processes to pretilt the liquid crystal molecules 301 by the first alignment layer 310 and the second alignment layer 320.

Finally, the liquid crystal molecules 301 can be pretilted more effectively and stably with the fringe field F produced at the slant portion 183 of the pixel electrode 180.

Figure 6:
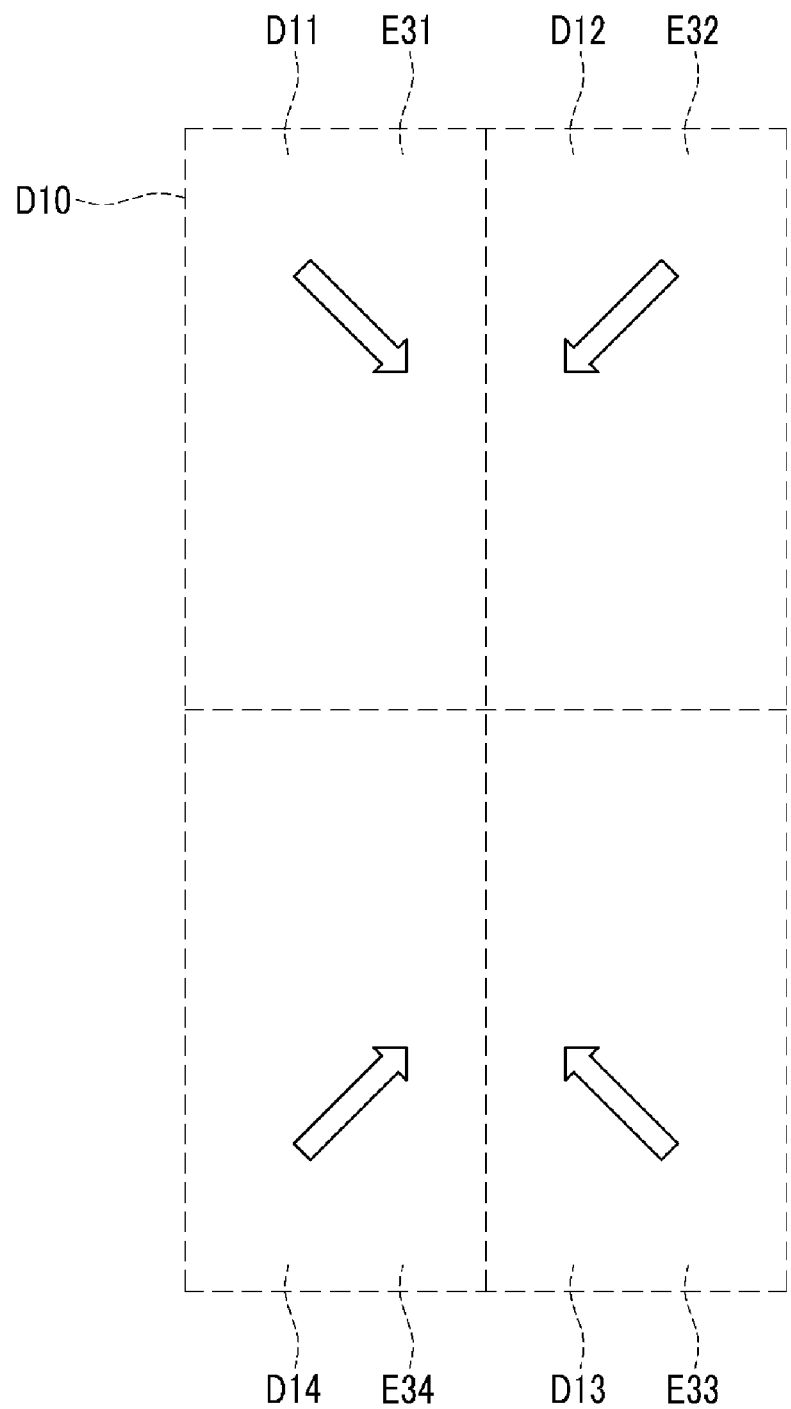
FIG. 6 is a plan view layout illustrating a pretilt direction of a first alignment layer and a second alignment layer in a display device according to an alternative exemplary embodiment of the present invention.

An alternative exemplary embodiment of the present invention will now be described in further detail with reference to FIG. 6. FIG. 6 is a plan view layout illustrating a pretilt direction of a first alignment layer and a second alignment layer in a display device according to an alternative exemplary embodiment of the present invention. More specifically, FIG. 6 illustrates pretilt directions Axx of a first alignment layer 310 and a second alignment layer 320 (FIG. 2) in a display device 902 according to an alternative exemplary embodiment of the present invention.

Referring to FIGS. 2 and 6, the first alignment layer 310 and the second alignment layer 320 include a fifth alignment region E31, a sixth alignment region E32, a seventh alignment region E33 and an eighth alignment region E34 having pretilt directions substantially equal to a direction of summed horizontal components of a fringe field F produced at an edge region of a pixel area P (FIG. 1) corresponding to the first domain D11, the second domain D12, the third domain D13 and the fourth domain D14 (FIGS. 4 and 5). For example, the first alignment layer 310 and the second alignment layer 320 have the fifth alignment region E31, the sixth alignment region E32, the seventh alignment region E33 and the eighth alignment region E34 corresponding to the first domain D11, the second domain D12, the third domain D13 and the fourth domain D14 included in a single domain group D10.

According to an exemplary embodiment described above, the display device 902 thereby has further enhanced light transmittance and response characteristics. However, a manufacturing efficiency may be lowered since four exposure processes are required for the first alignment layer 310 and the second alignment layer 320.

Alternative exemplary embodiments of the present invention are not limited to the description herein. For example, only one of the first alignment layer 310 and the second alignment layer 320 may pretilt the liquid crystal molecules 301, e.g., only one of the first alignment layer 310 and the second alignment layer 320 may have a pretilt direction, in which case the one of the first alignment layer 310 and the second alignment layer 320 which does not have the pretilt direction does not have a horizontal direction component. Accordingly, the liquid crystal molecules 301 are pretilted by only one of the first alignment layer 310 and the second alignment layer 320.

Also, each domain of the first domain D11, the second domain D12, the third domain D13 and the fourth domain D14 is formed only by the first alignment layer 310 or the second alignment layer 320 which has the pretilt direction.

As a result, the display device 902 according to an exemplary embodiment of the present invention may have further enhanced light transmittance and an increased manufacturing efficiency, but a response characteristic may thereby be lowered.

Figure 7:
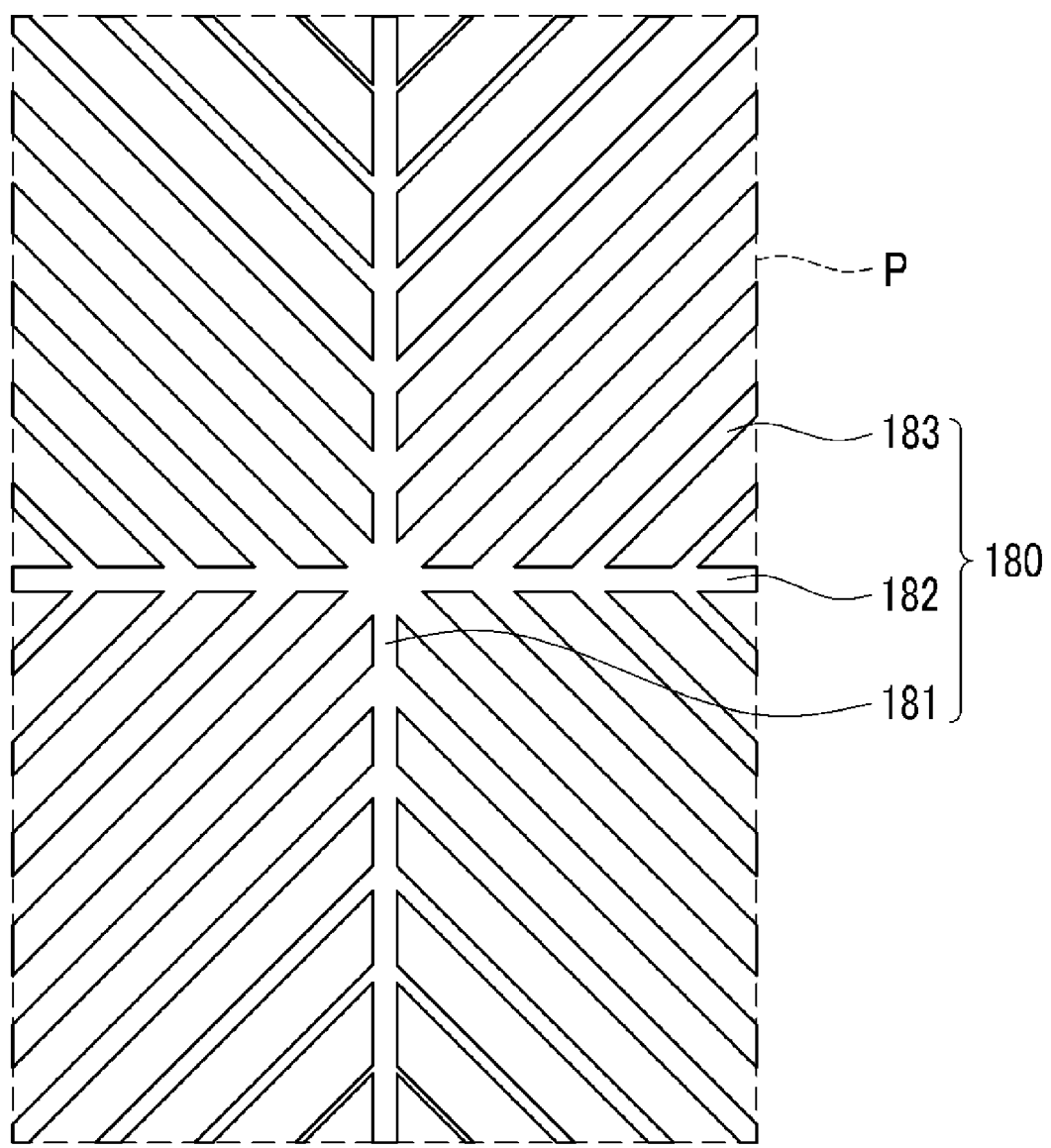
FIG. 7 is a plan view layout illustrating a pixel region of a display device according to yet another alternative exemplary embodiment of the present invention.

Yet another alternative exemplary embodiment of the present invention will now be described in further detail with reference to FIG. 7. FIG. 7 is a plan view layout illustrating a pixel region of a display device according to yet another alternative exemplary embodiment of the present invention.

More specifically, FIG. 7 represents a pixel electrode 180 used in a display device 903 according to an alternative exemplary embodiment of the present invention.

As shown in FIG. 7, the pixel electrode 180 includes a plurality of micro slits as described above in reference to FIGS. 1-3. Further, the pixel electrode 180 includes a vertical portion 181 aligned in a first direction, a transverse portion 182 crossing the vertical portion 181 aligned in a second direction substantially perpendicular to the first direction, and two or more slant portions 183. As shown in FIG. 7, the slant portions extend obliquely from the vertical portion 181 and the transverse portions 182, e.g., at a slant with respect to the first direction and/or the second direction. Although a single vertical portion 181 and a single transverse portion 182 are shown in FIG. 7, alternative exemplary embodiments of the present invention are not limited thereto.

In an exemplary embodiment, widths of the slant portions 183 are different from each other, as shown in FIG. 7. Further, gaps formed between adjacent slant portions 183 have different widths.

Thus, a fringe field F produced at the slant portion 183 pretilts liquid crystal molecules 301 (FIG. 2) more effectively and stably due to the different slant portion widths and the gap widths of the slant portion 183 of the pixel electrode 180 shown in FIG. 7. Accordingly, a viewing angle of the display device 903 is further enhanced.

Figure 8:
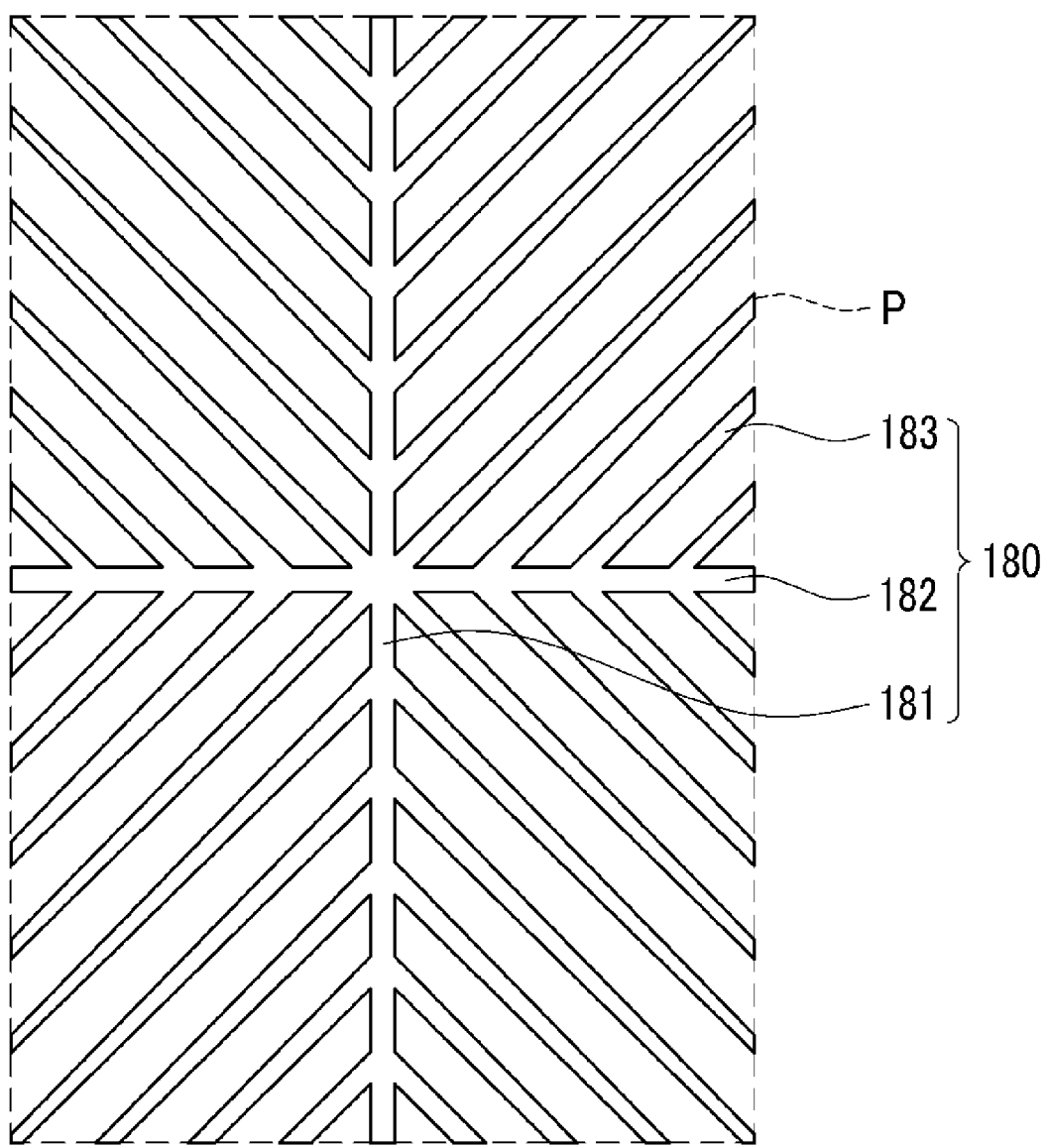
FIG. 8 is a plan view layout illustrating a pixel region of a display device according to still another alternative exemplary embodiment of the present invention.

Still another exemplary embodiment of the present invention will now be described in further detail with reference to FIG. 8. FIG. 8 is a plan view layout illustrating a pixel region of a display device according to still another alternative exemplary embodiment of the present invention. More specifically, FIG. 8 illustrates a pixel electrode 180 in a display device 904 according to an alternative exemplary embodiment of the present invention.

As shown in FIG. 8, the pixel electrode 180 has a plurality of micro slits as described above in reference to FIGS. 1-3. The pixel electrode 180 has a plurality of micro slits such that the pixel electrode 180 includes a vertical portion 181 aligned in a first direction, a transverse portion 182 crossing the vertical portion 181 aligned in a second direction substantially perpendicular to the first direction, and two or more slant portions 183 extending obliquely from the vertical portion 181 and the transverse portions 182 e.g., at a slant with respect to the first direction and/or the second direction. Although a single vertical portion 181 and a single transverse portion 182 are shown in FIG. 8, alternative exemplary embodiments of the present invention are not limited thereto.

Each slant portion 183 is formed to gradually vary a width thereof. More specifically, referring to FIG. 8, the slant portion 183 is formed to have a thinner width nearer an outer peripheral portion of a pixel area P than a width nearer an inner central portion of the pixel area P. Alternative exemplary embodiments of the present invention are not limited thereto, however.

A fringe field F produced at the slant portion 183 pretilts liquid crystal molecules 301 more effectively and stably by varying the width of the slant portion 183 of the pixel electrode 180. Accordingly, a viewing angle of the display device 904 is further enhanced.

Yet another exemplary embodiment of the present invention will now be described in further detail with reference to FIG. 9, which is a plan view layout of a display device according to another alternative exemplary embodiment of the present invention, as well as FIG. 2.

Figure 9:
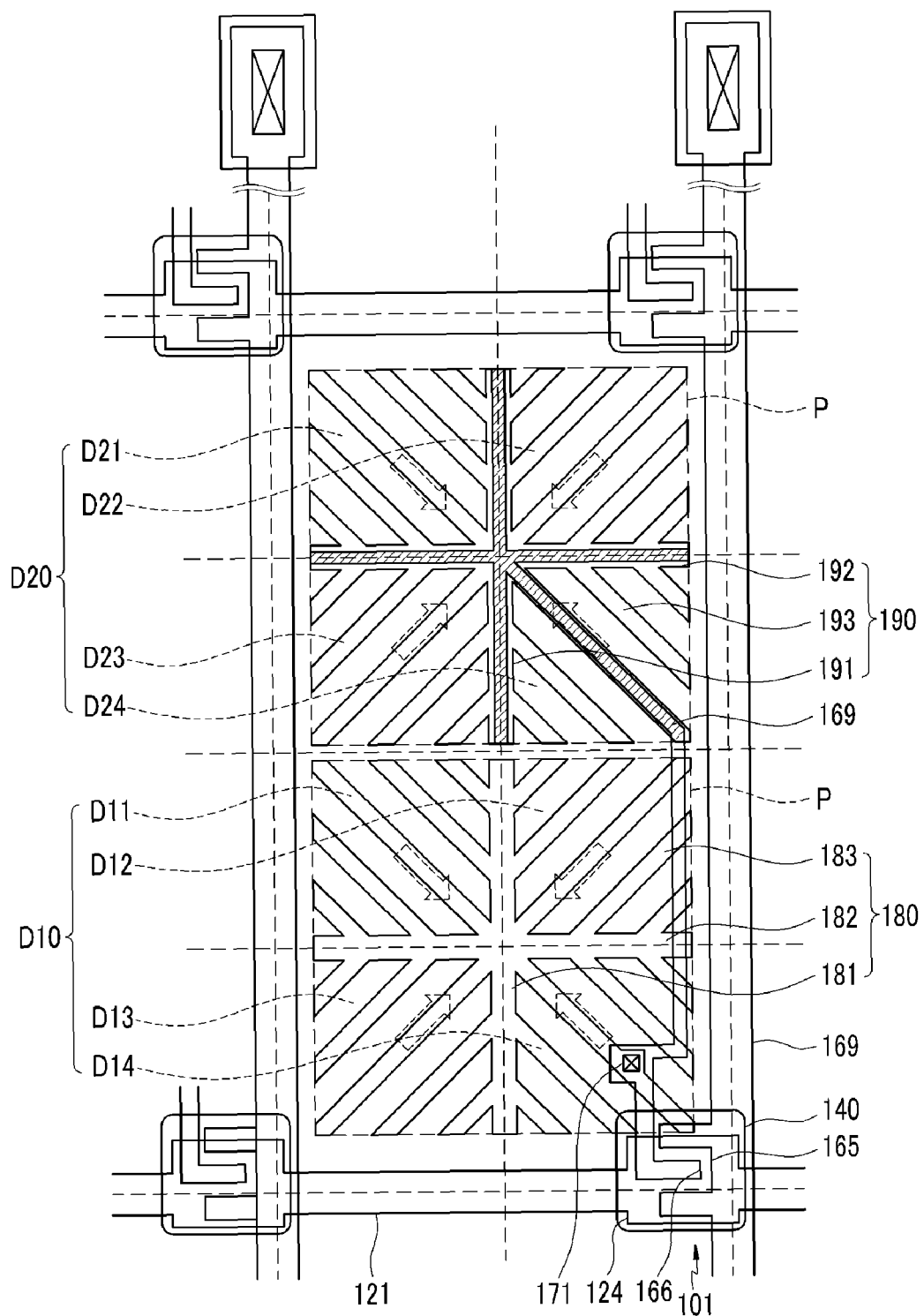
FIG. 9 is a plan view layout of a display device according to another alternative exemplary embodiment of the present invention.

As shown in FIG. 9, a display device 905 includes a pixel region P having a first pixel electrode 180 and a second pixel electrode 190, at least one first pixel electrode 180 and at least one second pixel electrode 190 are disposed in single pixel regions P.

Further, a single domain group D10 and a single domain group D20 corresponding to are located in the pixel region P and correspond to the first pixel electrode 180 and the second pixel electrode 190, respectively. More specifically, the first single domain group D10 having a first domain D11, a second domain D12, a third domain D13 and a fourth domain D14 corresponds to the first pixel electrode 190 and the second single domain group D20 having a fifth domain D21, a sixth domain D22, a seventh domain D23 and an eighth domain D24 corresponds with the second pixel electrode 190.

Further, each of the first pixel electrode 180 and the second pixel electrode 190 has a plurality of micro slits. Accordingly, the first pixel electrode 180 and the second pixel electrode 190 also each include a vertical portion 181 and 191, respectively, extending in a first direction, a transverse portion 182 and 192, respectively, crossing the vertical portions 181 and 191, respectively, and extending in a second direction substantially perpendicular to the first direction, and two or more slant portions 183 and 193, respectively, extending obliquely from the vertical portions 181 and 191, respectively, to the transverse portions 182 and 192, respectively, e.g., at a slant with respect to the first direction and/or the second direction.

The single domain groups D10 and D20 include respective domains as described above, formed by a combination of corresponding alignment regions of a first alignment layer 310 and corresponding alignment regions of a second alignment layer 320. More specifically, the single domain group D10 includes the first domain D11, the second domain D12, the third domain D13 and the fourth domain D14. The single domain group D20 includes the fifth domain D21, the sixth domain D22, the seventh domain D23 and the eighth domain D24.

Pretilts of the first alignment layer 310 and the second alignment layer 320 are formed to be substantially equal to a direction of summed horizontal components of fringe fields F produced at edges of the pixel region P where the first pixel electrode 180 and the second pixel electrode 190 of the respective domains are disposed with a direction of summed horizontal components having pretilt directions Axx of the first alignment layer 310 and/or the second alignment layer 320. Accordingly, liquid crystal molecules 301 in a liquid crystal layer 300 are pretilted as described above in greater detail.

Further, a extending direction of the slant portions 183 and 193, respectively, of the first pixel electrode 180, i.e. the main planar direction of the micro slits of the first pixel electrode 180 and the second pixel electrode 190 is substantially equal to the summed horizontal components of the pretilt directions Axx of the first alignment layer 310 and/or the second alignment layer 320. In More detail, the liquid crystal molecules are pretilted by an aligning force induced by the alignment layers and an average direction Axx of the liquid crystal molecules is substantially parallel to an extending direction of the main planar direction of the micro slits within each of the domains when the pretilted liquid crystal molecules are projected on the first panel.

As seen in FIG. 9, the pretilt directions of the first alignment layer 310 and the second alignment layer 320 are directed substantially inward, e.g., pointing from an outer peripheral edge of the pixel region P toward an inner center portion of the pixel region P.

The single domain group D01 and the single domain group D20 each include four domains pretilting the liquid crystal molecules 301 in different directions therein. Thus, a total number of domains is eight while the domains have four different pretilt directions.

However, alternative exemplary embodiments of the present invention are not limited thereto. For example, each domain of the first domain D11, the second domain D12, the third domain D13, the fourth domain D14, the fifth domain D21, the sixth domain D22, the seventh domain D23 and the eighth domain D24 may pretilt the liquid crystal molecules in different directions from each other, thereby providing a display device 905 having eight different pretilt directions.

Further, although the single domain groups D10 and D20 include four domains in FIG. 9, alternative exemplary embodiments of the present invention are not limited thereto. For example, each single domain group D10 or D20 may formed with two or more domains.

Still referring to FIG. 9, a thin film transistor 101 is directly connected to the first pixel electrode 180 through a contact hole 171 and is indirectly connected to the second pixel electrode 190 through a coupling capacitance $C_{CP}$.

Accordingly, the first pixel electrode 180 and the second pixel electrode 190 are effectively supplied with different data signals. More specifically, the first pixel electrode 180 is supplied with a data signal directly through a drain electrode 166 of the thin film transistor 101 while the second pixel electrode 190 receives the data signal through the drain electrode 166 of the thin film transistor 101 via the coupling capacitance $C_{CP}$ formed in an insulating film 169 disposed between the second pixel electrode 190 and an extension portion 190 of the drain electrode 166. Accordingly, the second pixel electrode 190 is supplied with a lower value data signal compared to the first pixel electrode 190 and a brightness of the first domain group D10 corresponding to the first pixel electrode 180 is therefore different from a brightness of the second domain group D20 corresponding to the second pixel electrode 190. In an exemplary embodiment, a voltage supplied to the second pixel electrode 190 may be in a range from about 50% to about 90% of a voltage supplied to the first pixel electrode 180.

Since the brightness of the first domain group D10 is different from the brightness of the second domain group D20, alternating domains pretilting the liquid crystal molecules 301 in the same direction from the first domain group D01 and the second domain group D02 are effectively different domains. Accordingly, all domains in one pixel region P are essentially different domains and may be used as such. Accordingly, a lateral view angle of the display device 905 according to an exemplary embodiment of the present invention is further enhanced through compensating between a front and a lateral brightness and color.

Thus, the display device 905 has a further enhanced viewing angle and display characteristic. Also, by pretilting liquid crystal molecules 301 at edges of the pixel region P where the first pixel electrode 180 and the second pixel electrode 190 are disposed by the first alignment layer 310 and the second alignment layer 320, collisions between the liquid crystal molecules 301 are substantially reduced or effectively minimized, as described above in greater detail.

Also, a pretilt pattern on the common electrode 280 to pretilt the liquid crystal molecules 301 in the liquid crystal layer 300 is not necessary since the liquid crystal molecules 301 are vertically aligned as well as pretilted by the first alignment layer 310 and the second alignment layer 320. Accordingly, a manufacturing process of the display device 905 is further simplified, as described above in greater detail.

Furthermore, the liquid crystal molecules 301 in the liquid crystal layer 300 are pretilted more effectively and stably and thereby have reduced response time through using the fringe field F produced at the slant portions 183 and 193 formed in the first pixel electrode 180 and the second pixel electrode 190, respectively, and formed by the micro slits. Accordingly, a viewing angle of the display device 905 is further improved.

Still another exemplary embodiment of the present invention will now be described in further detail with reference to FIG. 10, which is a plan view layout of a display device according to another alternative exemplary embodiment of the present invention, as well as FIG. 2

Figure 10:
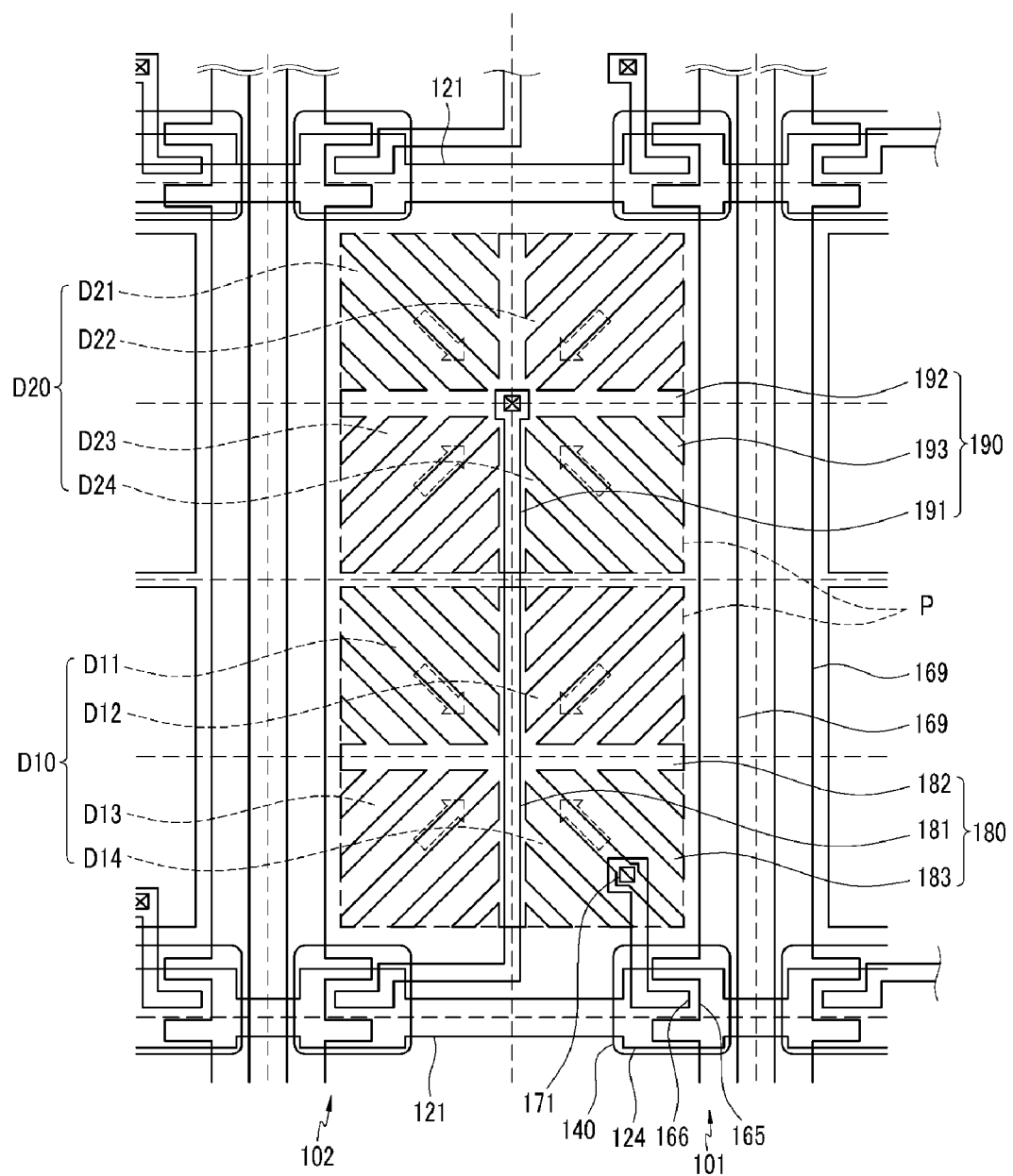
FIG. 10 is a plan view layout of a display device according to another alternative exemplary embodiment of the present invention.

As shown in FIG. 10, a display device 906 includes a pixel region P having a first pixel electrode 180 and a second pixel electrode 190.

The first pixel electrode 180 and the second pixel electrode 190 have a plurality of micro slits. Accordingly, the first pixel electrode 180 and the second pixel electrode 190 are also configured to include vertical portions 181 and 191, respectively, aligned in a first direction, transverse portions 182 and 192 crossing the vertical portions 181 and 191, respectively, and two or more slant portions 183 and 193, respectively, longitudinally extending from the vertical portions 181 and 191, respectively, to the transverse portions 182 and 192, respectively.

The single domain groups D10 and D20 include a plurality of domains, e.g., the single domain group D10 includes a first domain D11, a second domain D12, a third domain D13 and a fourth domain D14. The single domain group D20 includes a fifth domain D21, a sixth domain D22, a seventh domain D23 and a eighth domain D24.

Pretilts of the first alignment layer 310 and the second alignment layer 320 are formed to be substantially equal to a direction of summed horizontal components of fringe fields F produced at edges of the pixel region P where the first pixel electrode 180 and the second pixel electrode 190 of the respective domains are disposed with a direction of summed horizontal components having pretilt directions Axx of the first alignment layer 310 and/or the second alignment layer 320. Accordingly, liquid crystal molecules 301 in a liquid crystal layer 300 are pretilted as described above in greater detail.

Further, an extending direction of the slant portions 183 and 193, respectively, of the first pixel electrode 180 and the second pixel electrode 190 is substantially equal to the summed horizontal components of the pretilt directions Axx of the first alignment layer 310 and/or the second alignment layer 320. In More detail, the liquid crystal molecules are pretilted by an aligning force induced by the alignment layers and an average direction Axx of the liquid crystal molecules is substantially parallel to an extending direction of the main planar direction of the micro slits within each of the domains when the pretilted liquid crystal molecules are projected on the first panel.

As seen in FIG. 10, the pretilt directions of the first alignment layer 310 and the second alignment layer 320 are directed substantially inward, e.g., pointing from an outer peripheral edge of the pixel region P toward an inner center portion of the pixel region P.

The single domain group D10 and the single domain group D20 each include four domains pretilting the liquid crystal molecules 301 in different directions therein. Thus, a total number of domains is eight while the domains have four different pretilt directions.

However, alternative exemplary embodiments of the present invention are not limited thereto. For example, each domain of the first domain D11, the second domain D12, the third domain D13, the fourth domain D14, the fifth domain D21, the sixth domain D22, the seventh domain D23 and the eighth domain D24 may pretilt the liquid crystal molecules in different directions from each other, thereby providing a display device 906 having eight different pretilt directions.

Also, although the single domain groups D10 and D20 include four domains in FIG. 9, alternative exemplary embodiments of the present invention are not limited thereto. For example, each single domain group D10 or D20 may be properly formed with two or more domains.

Still referring to FIG. 10, a first thin film transistor 101 is connected to the first pixel electrode 180 and a second thin film transistor 102 is connected to the second pixel electrode 190. Further, the first thin film transistor 101 and the second thin film transistor 102 are connected to different data lines 161. Thus, different data signals can be applied to the first pixel electrode 180 and the second pixel electrode 190 through the first thin film transistor 101 and the second thin film transistor 102, respectively.

Accordingly, a brightness of the single domain group D10 corresponding to the first pixel electrode 180 can be different from a brightness of the single domain group D20 corresponding to the second pixel electrode 190.

Since the brightness of the single domain group D10 may be different than the brightness of the single domain group D20, alternating domains pretilting the liquid crystal molecules 301 in the same direction from the first domain group D01 and the second domain group D02 are effectively different domains. Accordingly, domains in one pixel region P may be used as different domains. Accordingly, lateral viewing angle is further enhanced through compensating between a front and a lateral brightness and color.

According to the exemplary embodiment as described above, the display device 905 has a further enhanced viewing angle and display characteristic. Also, through pretilting the liquid crystal molecules 301 by the fringe field F produced at edges of the pixel region P where the first pixel electrode 180 and the second pixel electrode 190 are disposed by the first alignment layer 310 and the second alignment layer 320, collisions between the liquid crystal molecules 301 are substantially reduced or effectively minimized, as described above in greater detail.

Also, pretilt pattern on the common electrode 280 to pretilt the liquid crystal molecules 301 in the liquid crystal layer 300 is not necessary since the liquid crystal molecules 301 are vertically aligned as well as pretilted by the first alignment layer 310 and the second alignment layer 320. Accordingly, a manufacturing process of the display device 905 may be further simplified since the patterning in the common electrode 280 is not necessary when the micro pattern is formed only in the pixel electrode 180.

Also, the liquid crystal molecules 301 in the liquid crystal layer 300 are pretilted more effectively and stably using the fringe field F produced at the slant portions 183 and 193 formed by the micro slits of the pixel electrodes 180 and 190. Accordingly, a viewing angle of the display device 905 is further improved.

Figure 11:
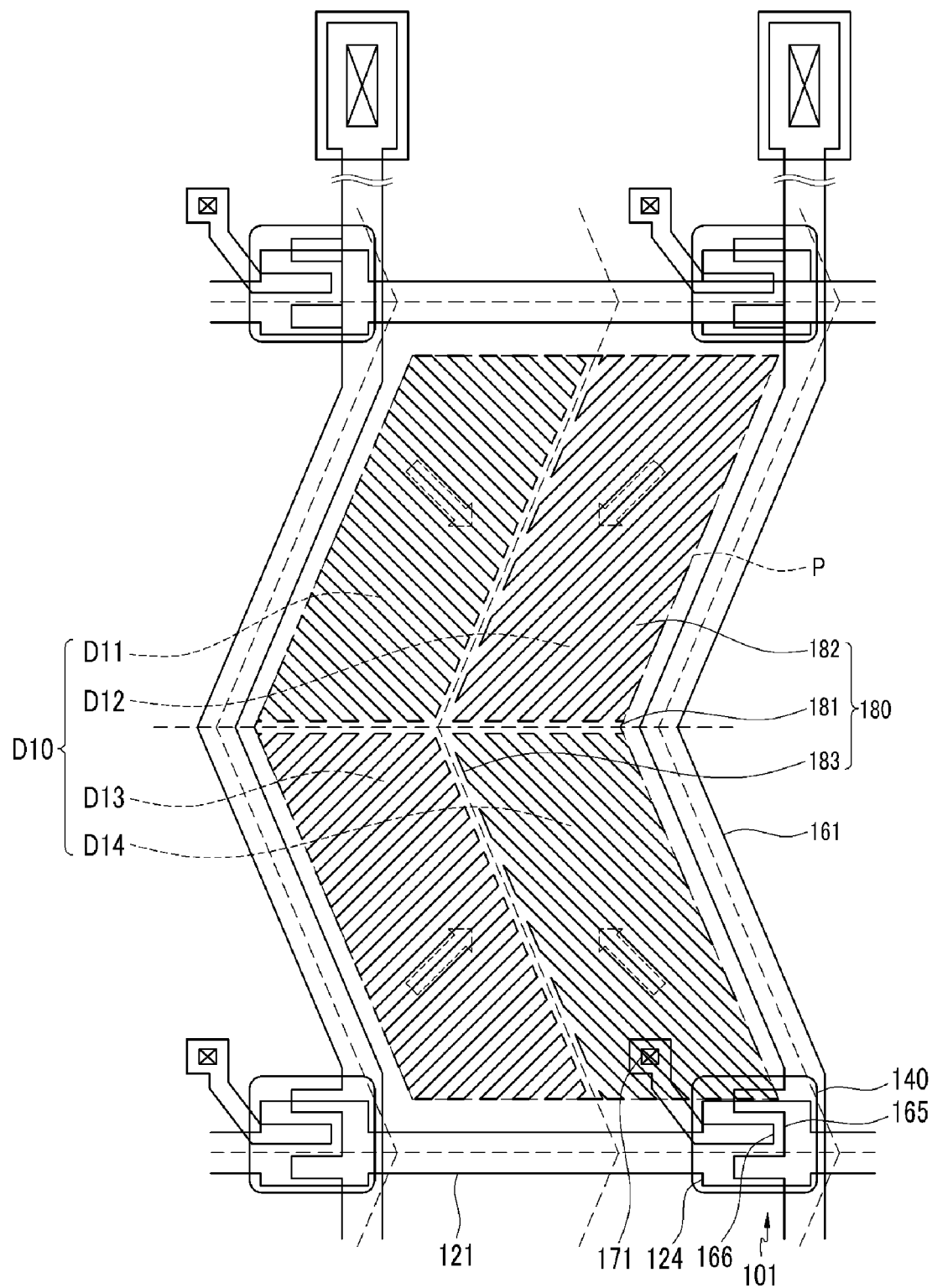
FIG. 11 is a plan view layout of a display device according to another alternative exemplary embodiment of the present invention.

Another exemplary embodiment of the present invention will now be described in further detail with reference to FIG. 11, which is a plan view layout of a display device according to another alternative exemplary embodiment of the present invention, as well as FIG. 2. As shown in FIG. 11, a pixel electrode 180 has a plurality of micro slits, as described above in greater detail. Further, a pixel region P having the pixel electrode 180 has at least one side formed in a slanted direction with respect to an adjacent pair of gate lines 121, for example. More specifically, adjacent corners of the pixel region P are formed at acute and/or obtuse angles rather than at right angles, as shown in the exemplary embodiments in FIGS. 1, 2 and 7-10. Thus, at least one gate line 121 or one data line 161 is bent to conform to the slant portion of the pixel region P in a substantially zigzag manner. Further, a corresponding side of the pixel portion P formed in the slant direction is formed substantially parallel with an opposite side of the pixel region P (e.g., also formed in the slant direction).

Further, the pixel electrode 180 pattern includes a vertical portion 181 aligned in a first direction, a transverse portion 182 crossing the vertical portion 181 and aligned in a second direction substantially perpendicular to the first direction, and two or more slant portions 183 extending longitudinally from the vertical portion 181 to the transverse portion 182. In an exemplary embodiment, the vertical portion 181 of the pixel electrode 180 is formed substantially parallel with the slant portion of the data line 161 as shown in FIG. 11 or, alternatively, the gate line 121.

Still referring to FIG. 11, the vertical portion 181 of the pixel electrode 180 is formed substantially parallel with the data line 161. However, alternative exemplary embodiments of the present invention are not limited thereto. For example, a longitudinal side edge of the pixel region P may be formed in the slant direction while the gate line 121 and the data line 161 each remain substantially perpendicular to each other.

As can be seen in FIG. 11, a side formed in the slant direction of the pixel region P has at least one bent part. However, alternative exemplary embodiments of the present invention are not limited thereto. For example, the side formed in the slant direction of the pixel electrode 180 may not include a bent part, e.g., alternative exemplary embodiments of the present invention may include the pixel electrode 180 and/or the pixel region P having a variety of structures not explicitly described herein, such as a chevron structure, a Z cell structure or a double Z cell structure, for example, but not being limited thereto.

The side of the pixel region P formed in the slant direction is formed at a predetermined angle with a polarizing axis of a polarizing plate (not shown) attached to a first panel 100 and a second panel 200. Accordingly, a view angle of the display device 907 is thereby enhanced and an area of the polarizing plate is more efficiently used during a manufacturing process.

Also, a first alignment layer 310 and a second alignment layer 320 divide the pixel region P into a single domain group D10 having a first domain D11, a second domain D12, a third domain D13 and a fourth domain D14, as described above in greater detail.

Pretilts of the first alignment layer 310 and the second alignment layer 320 are formed to be substantially equal to a direction of summed horizontal components of fringe fields F produced at edges of respective domains of the first domain D11, the second domain D12, the third domain D13 and the fourth domain D14 in the pixel region P with a direction of summed horizontal components in the pretilt directions Axx of the first alignment layer 310 and the second alignment layer 320. Accordingly, liquid crystal molecules 301 in a liquid crystal layer 300 are pretilted in respective pretilt directions Axx.

Further, the main direction of the micro slits, i.e. a longitudinal direction of the slant portions 183 of the pixel electrode 180 are substantially equal to the summed horizontal components in the pretilt directions Axx of the first alignment layer 310 and the second alignment layer 320. In More detail, the liquid crystal molecules are pretilted by an aligning force induced by the alignment layers and an average direction Axx of the liquid crystal molecules is substantially parallel to an extending direction of the main planar direction of the micro slits within each of the domains when the pretilted liquid crystal molecules are projected on the first panel.

According to the exemplary embodiment of the present invention as described above, the display device 907 has an enhanced viewing angle and display characteristic. Also, through pretilting of the liquid crystal molecules 301 by the fringe field F produced at the edges of the pixel region P where the pixel electrode 180 is disposed by the first alignment layer 310 and the second alignment layer 320, collisions between the liquid crystal molecules 301 are minimized.

Also, a pretilt pattern on the common electrode 280 to pretilt the liquid crystal molecules 301 in the liquid crystal layer 300 is not necessary since the liquid crystal molecules 301 are vertically aligned as well as pretilted by the first alignment layer 310 and the second alignment layer 320. Accordingly, a manufacturing process of the display device 905 is further simplified since the patterning in the common electrode 280 is not necessary when the micro pattern is formed only in the pixel electrode 180.

Also, the liquid crystal molecules 301 in the liquid crystal layer 300 are pretilted more effectively and stably using the fringe field F produced at the slant portions 183 formed as the slit pattern in the pixel electrode 180. Accordingly, a viewing angle of the display device 907 is thereby further improved.

Alternative exemplary embodiments of the present invention are not restricted to a structure of the single domain group D10 as described above. For example, a plurality of single domain groups corresponding to a pixel region P may be formed.

As described above, a viewing angle, a display characteristic and a manufacturing efficiency may be enhanced in a display device according to exemplary embodiments of the present invention.

Specifically, by substantially equating a pretilt direction of liquid crystal molecules according to an undesired fringe field produced at edges of a pixel region where a pixel electrode is disposed, e.g., by pretilting the liquid crystal molecules by a first alignment layer and/or a second alignment layer, collisions between the liquid crystal molecules are substantially reduced or effectively minimized. Accordingly, a texture produced by the collisions of the liquid crystal molecules is substantially reduced or effectively minimized.

In addition, the liquid crystal molecules in the liquid crystal layer can be pretilted more effectively and stably by using a desired fringe field produced at slant portions of the pixel electrode. Accordingly, a viewing angle of the display device is further improved.

Further, since the liquid crystal molecules are pretilted by the alignment layer, it is unnecessary to form a pattern in the common electrode to pretilt the liquid crystal molecules of liquid crystal layer. Accordingly, the micro slits are formed only in the pixel electrode, and a manufacturing process of the display device is further simplified. For example, the first alignment layer and the second alignment layer vertically align the liquid crystal molecules in the liquid crystal layer thereby perform a role of pretilting the liquid crystal molecules in stead of other components, e.g., the common electrode.

Finally, the first alignment layer and the second alignment layer are formed through an exposure process using a mask. Accordingly, additional processes to pretilt the liquid crystal molecules by the first alignment layer and the second alignment layer are substantially reduced or effectively minimized.

Figure 12:
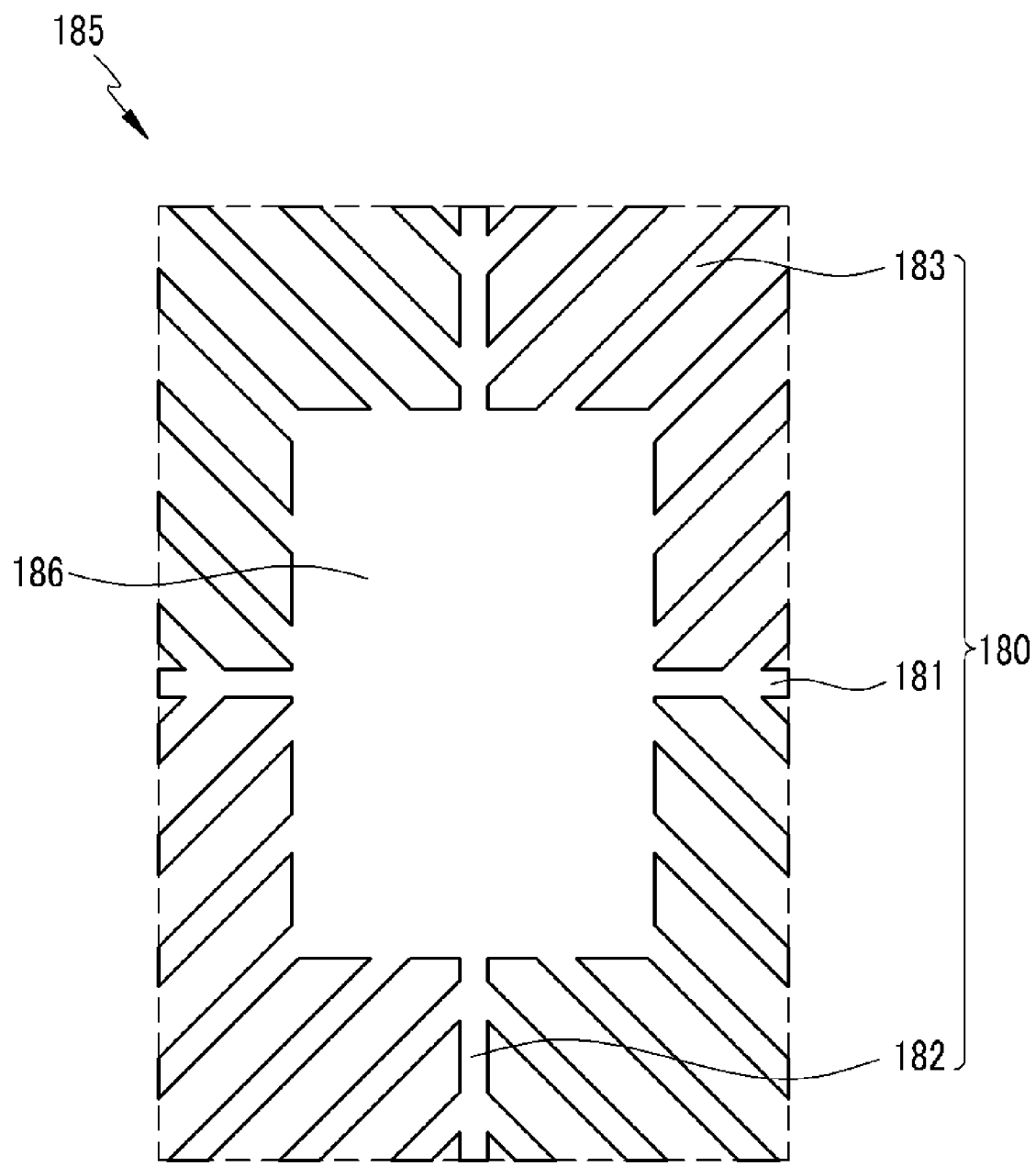
FIG. 12 is a plan view layout illustrating a pixel region of a display device according to still another alternative exemplary embodiment of the present invention.

Below, another embodiment of the present invention will be described with reference to FIG. 12. FIG. 12 shows a pixel 185 used in the display device according to the eighth embodiment of the present invention. The display device according to the eighth embodiment has the substantially same as that shown in FIGS. 1 and 2.

As shown in FIG. 12, a pixel electrode 180 of the pixel area 185 includes a main body portion 186 and a transverse portion 182, a vertical portion 181 and a slant portion 183, that are formed by a plurality of micro slits and surrounds the main body portion 186. The transverse portion 182 and the vertical portion 181 are extended from the main body portion 186 and intersect with each other. The slant portion 183 is slantly extended from one among the main body portion 186, the transverse portion 182 and the vertical portion 181.

Specifically, the slant portion 183 is formed at a predetermined angle with the polarizing axis of the polarizing plate attached to the first and second panels 100 and 200 (refer to FIG. 2).

With this configuration, the display device is not only improved in a view angle and a display characteristic, but also efficiently enhances transmittance. Further, the micro slits of the pixel electrode 180 minimizes collisions and interferences between the liquid crystal molecules due to a fringe field at an edge of the pixel electrode 185. Meanwhile, the micro slit pattern 180 may cause the transmittance to be lowered. Accordingly, the pixel area 185, which corresponds to a region where the liquid crystal molecules are not affected by the fringe field, may have only the flat main body portion 186 without the micro slits, thereby enhancing the transmittance.

Here, the transverse portion 182 and the vertical portion 181 are extended from the main body portion 186 to have lengths of 10 μm or more, respectively. These lengths are determined in consideration of the region where the liquid crystal molecules are effected by the fringe field at the edge of the pixel electrode 185.

In FIG. 12, the main body portion 186 is shaped like a rectangle, but not limited thereto. Alternatively, the main body portion 186 may be shaped like one of a circle, an ellipse and a polygon.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A display device comprising:
a first panel including a pixel electrode in a pixel region;
a second panel facing to the first panel and including a common electrode;
a liquid crystal layer interposed between the first panel and the second panel, the liquid crystal layer having vertically aligned liquid crystal molecules;
a first alignment layer disposed on the pixel electrode; and
a second alignment layer disposed on the common electrode,
wherein at least one of the pixel electrode and the common electrode has a plurality of micro slits to form a plurality of domains,
the liquid crystal molecules are pretilted by an aligning force induced by the first alignment layer and the second alignment layer within each of the domains, and when the pretilted liquid crystal molecules are projected on the first panel, an average direction of the pretilted liquid crystal molecules is substantially parallel to an extending direction of the micro slits within each of the domains.

2. The display device according to claim 1, wherein the common electrode is slitless.

3. The display device according to claim 1, wherein the first alignment layer and the second alignment layer comprise a photo sensitive polymer.

4. The display device according to claim 3, wherein the first alignment layer and the second alignment layer are formed by photo irradiation.

5. The display device according to claim 1, wherein the pixel electrode comprises:
- a first portion disposed in a first direction;
- a second portion crossing the first portion and disposed in a second direction substantially perpendicular to the first direction; and
- two or more third portions substantially parallel to each other and disposed obliquely between the first portion and the second portion.

6. The display device according to claim 5, wherein the third portions are apart from each other by less than about 6 μm.

7. The display device according to claim 5, wherein a width of at least one of the two or more third portions is less than about 6 μm.

8. The display device according to claim 7, wherein widths of each of the two or more third portions are equal.

9. The display device according to claim 7, wherein widths of each of the two or more third portions are different.

10. The display device according to claim 7, wherein widths of the two or more third portions vary gradually.

11. The display device according to claim 1, wherein
at least one of the first alignment layer and the second alignment layer has a plurality of alignment regions, and
each of the alignment regions has a different alignment direction.

12. The display device according to claim 11, wherein
at least one of the first alignment layer and the second alignment layer forms four or more domains of the plurality of domains in which the liquid crystal molecules are pretilted in different directions,
the four or more domains form a single domain group, and
the single domain group corresponds to the pixel region.

13. The display device according to claim 1, wherein
the pixel electrode comprises a main body portion;
the micro slits are placed outside the main body portion; and
the pixel electrode comprises one or more transverse and vertical portions extended from the main body portion, and a plurality of slant portions extended from one among the main body portion, the transverse portion and the vertical portion.

14. The display device according to claim 13, wherein the transverse portion and the vertical portion of the pixel electrode have lengths of 10 μm or more, respectively.

15. A display device comprising:
a first panel having a pixel region, the first panel comprising:
a thin film transistor;
a first pixel electrode disposed in the pixel region and connected to the thin film transistor; and
a second pixel electrode disposed in the pixel region and connected to the thin film transistor through a coupling capacitor;
a second panel facing the first panel and having a common electrode;
a liquid crystal layer interposed between the first panel and the second panel, the liquid crystal layer having vertically aligned liquid crystal molecules;
a first alignment layer disposed on the first pixel electrode and the second pixel electrode; and
a second alignment layer disposed on the common electrode,
wherein at least one of the first pixel electrode, the second pixel electrode, and the common electrode has a plurality of micro slits to form a plurality of domains,
the liquid crystal molecules are pretilted by an aligning force induced by the first alignment layer and the second alignment layer within each of the domains, and
when the pretilted liquid crystal molecules are projected on the first panel, an average direction of the pretilted liquid crystal molecules is substantially parallel to an extending direction of the micro slits within each of the domains.

16. The display device according to claim 15, wherein the common electrode is slitless.

17. The display device according to claim 15, wherein the first alignment layer and the second alignment layer comprise a photo sensitive polymer.

18. The display device according to claim 17, wherein the first alignment layer and the second alignment layer are formed by photo irradiation.

19. The display device according to claim 15, wherein the first pixel electrode and the second pixel electrode comprise:
- a first portion aligned in a first direction;
- a second portion crossing the first portion and aligned in a second direction substantially perpendicular to the first direction; and
- two or more third portions substantially parallel to each other and disposed obliquely between the first portion and to the second portion.

20. A display device comprising:
a first panel having a pixel region, the first panel comprising:
a first thin film transistor and a second thin film transistor;
a first pixel electrode disposed in the pixel region and connected to the first thin film transistor; and
a second pixel electrode disposed in the pixel region and connected to the second thin film transistor;
a second panel facing the first panel and having a common electrode;
a liquid crystal layer interposed between the first panel and the second panel, the liquid crystal layer having vertically aligned liquid crystal molecules;
a first alignment layer disposed on the first pixel electrode and the second pixel electrode; and
a second alignment layer disposed on the common electrode,
wherein at least one of the first pixel electrode, the second pixel electrode, and the common electrode has a plurality of micro slits to form a plurality of domains,
the liquid crystal molecules are pretilted by an aligning force induced by the first alignment layer and the second alignment layers within each of the domains, and
when the pretilted liquid crystal molecules are projected on the first panel, an average direction of the pretilted liquid crystal molecules is substantially parallel to an extending direction of the micro slits within each of the domains.

21. The display device according to claim 20, wherein the common electrode is slitless.

22. The display device according to claim 20, wherein the first alignment layer and the second alignment layer comprise a photo sensitive polymer.

23. The display device according to claim 22, wherein the first alignment layer and the second alignment layer are formed by photo irradiation.

24. The display device according to claim 20, wherein the first pixel electrode and the second pixel electrode comprise:
- a first portion aligned in a first direction;
- a second portion crossing the first portion and aligned in a second direction substantially perpendicular to the first direction; and
- two or more third portions substantially parallel to each other and disposed obliquely between the first portion and to the second portion.

25. A display device comprising:
- a first panel having a pixel region;
- a pixel electrode disposed in the pixel region, a first side of the pixel electrode being formed at one of an obtuse angle and an acute angle with respect to an adjacent second side of the pixel electrode;
- a second panel facing the first panel and having a common electrode;
- a liquid crystal layer interposed between the first panel and the second panel, the liquid crystal layer having vertically aligned liquid crystal molecules;
- a first alignment layer disposed on the pixel electrode; and
- a second alignment layer disposed on the common electrode,
- wherein at least one of the pixel electrode and the common electrode has a plurality of micro slits to form a plurality of domains,
- the liquid crystal molecules are pretilted by an aligning force induced by the first alignment layer and the second alignment layer within each of the domains, and
- when the pretilted liquid crystal molecules are projected on the first panel, an average direction of the pretilted liquid crystal molecules is substantially parallel to an extending direction of the micro slits within each of the domains.

26. The display device according to claim 25, wherein the first side of the pixel electrodes comprises at least one bent part.

27. The display device according to claim 25, wherein the common electrode is slitless.

28. The display device according to claim 25, wherein the first alignment layer and the second alignment layer comprise a photo sensitive polymer.

29. The display device according to claim 28, wherein the first alignment layer and the second alignment layer are formed by photo irradiation.

30. The display device according to claim 25, wherein the pixel electrode comprises:
- a first portion aligned in a first direction;
- a second portion crossing the first portion and aligned in a second direction substantially perpendicular to the first direction; and
- two or more third portions substantially parallel to each other and disposed obliquely between the first portion and the second portion.

* * * * *